United States Patent
Gibson et al.

(10) Patent No.: US 12,146,756 B2
(45) Date of Patent: *Nov. 19, 2024

(54) REAL TIME RISK ASSESSMENT AND OPERATIONAL CHANGES WITH SEMI-AUTONOMOUS VEHICLES

(71) Applicant: Allstate Insurance Company, Northbrook, IL (US)

(72) Inventors: Timothy W. Gibson, Barrington, IL (US); Surender Kumar, Palatine, IL (US); Regina Madigan, Mountain View, CA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,386

(22) Filed: May 15, 2023

(65) Prior Publication Data

US 2023/0280175 A1  Sep. 7, 2023

Related U.S. Application Data

(63) Continuation of application No. 17/194,594, filed on Mar. 8, 2021, now Pat. No. 11,692,838, which is a
(Continued)

(51) Int. Cl.
*G01C 21/34* (2006.01)
*B60W 50/08* (2020.01)
(Continued)

(52) U.S. Cl.
CPC ....... *G01C 21/3492* (2013.01); *B60W 50/082* (2013.01); *B60W 60/0051* (2020.02);
(Continued)

(58) Field of Classification Search
CPC .......... G01C 21/3492; G01C 21/3461; B60W 50/082; B60W 60/0051; B60W 60/0053;
(Continued)

(56) References Cited

U.S. PATENT DOCUMENTS

| 6,405,132 B1 | 6/2002 | Breed et al. |
| 8,509,982 B2 | 8/2013 | Montemerlo et al. |

(Continued)

FOREIGN PATENT DOCUMENTS

| DE | 102013013867 A1 | 3/2015 |
| EP | 3303083 A1 | 4/2018 |

(Continued)

OTHER PUBLICATIONS

Oct. 17, 2018—(US) Non-Final Office Action—U.S. Appl. No. 15/433,562, 30 Pages.

(Continued)

*Primary Examiner* — Richard M Camby
(74) *Attorney, Agent, or Firm* — Polsinelli PC

(57) ABSTRACT

A route risk mitigation system and method using real-time information to improve the safety of vehicles operating in semi-autonomous or autonomous modes. The method mitigates the risks associated with driving by assigning real-time risk values to road segments and then using those real-time risk values to select less risky travel routes, including less risky travel routes for vehicles engaged in autonomous driving over the travel routes. The route risk mitigation system may receive location information, real-time operation information, (and/or other information) and provide updated associated risk values. In an embodiment, separate risk values may be determined for vehicles engaged in autonomous driving over the road segment and vehicles engaged in manual driving over the road segment.

20 Claims, 11 Drawing Sheets

Related U.S. Application Data continuation of application No. 15/433,562, filed on Feb. 15, 2017, now Pat. No. 10,942,038.

(60) Provisional application No. 62/295,385, filed on Feb. 15, 2016.

(51) Int. Cl.
*B60W 60/00* (2020.01)
*G06Q 40/08* (2012.01)

(52) U.S. Cl.
CPC .... *B60W 60/0053* (2020.02); *B60W 60/0059* (2020.02); *G01C 21/3461* (2013.01); *G06Q 40/08* (2013.01); *B60W 2552/05* (2020.02); *B60W 2552/10* (2020.02); *B60W 2552/30* (2020.02); *B60W 2552/35* (2020.02); *B60W 2554/406* (2020.02); *B60W 2555/20* (2020.02); *B60W 2555/60* (2020.02); *B60W 2556/10* (2020.02); *B60W 2556/65* (2020.02)

(58) Field of Classification Search
CPC ......... B60W 60/0059; B60W 2552/05; B60W 2552/10; B60W 2552/30; B60W 2552/35; B60W 2554/406; B60W 2555/20; B60W 2555/60; B60W 2556/10; B60W 2556/65; B60W 2556/50; B60W 2720/10; B60W 2756/10; B60W 50/14; B60W 60/0015; G06Q 40/08; G05D 1/0061

See application file for complete search history.

(56) References Cited

U.S. PATENT DOCUMENTS

| | | | |
|---|---|---|---|
| 8,595,037 | B1 | 11/2013 | Hyde et al. |
| 8,606,512 | B1 | 12/2013 | Bogovich et al. |
| 9,020,751 | B1 | 4/2015 | Bogovich et al. |
| 9,141,995 | B1 | 9/2015 | Brinkmann et al. |
| 9,188,985 | B1 | 11/2015 | Hobbs et al. |
| 9,274,525 | B1 | 3/2016 | Ferguson et al. |
| 9,355,423 | B1 | 5/2016 | Slusar |
| 9,368,026 | B1 | 6/2016 | Herbach et al. |
| 9,390,451 | B1 | 7/2016 | Slusar |
| 9,507,346 | B1 | 11/2016 | Levinson et al. |
| 9,528,850 | B1 | 12/2016 | Hobbs et al. |
| 9,552,726 | B2 | 1/2017 | McGrath et al. |
| 9,715,711 | B1 | 7/2017 | Konrardy et al. |
| 9,805,423 | B1 | 10/2017 | Konrardy et al. |
| 9,932,033 | B2 | 4/2018 | Slusar et al. |
| 9,944,282 | B1 | 4/2018 | Fields et al. |
| 9,972,054 | B1 * | 5/2018 | Konrardy ............... G06Q 40/00 |
| 10,096,067 | B1 | 10/2018 | Slusar |
| 10,386,192 | B1 | 8/2019 | Konrardy et al. |
| 10,942,038 | B2 * | 3/2021 | Gibson ............... G01C 21/3492 |
| 2002/0194016 | A1 | 12/2002 | Moribe et al. |
| 2007/0164852 | A1 | 7/2007 | Litkouhi |
| 2010/0063672 | A1 | 3/2010 | Anderson |
| 2012/0083964 | A1 | 4/2012 | Montemerlo et al. |
| 2013/0211656 | A1 | 8/2013 | An et al. |
| 2013/0304513 | A1 | 11/2013 | Hyde et al. |
| 2014/0136045 | A1 | 5/2014 | Zhu et al. |
| 2014/0156133 | A1 | 6/2014 | Cullinane et al. |
| 2014/0303827 | A1 | 10/2014 | Dolgov et al. |
| 2014/0324268 | A1 | 10/2014 | Montemerlo et al. |
| 2015/0170287 | A1 | 6/2015 | Tirone et al. |
| 2015/0266490 | A1 | 9/2015 | Coelingh et al. |
| 2015/0314780 | A1 | 11/2015 | Stenneth et al. |
| 2016/0026180 | A1 | 1/2016 | Tsimhoni et al. |
| 2016/0167652 | A1 | 6/2016 | Slusar |
| 2016/0189306 | A1 | 6/2016 | Bogovich et al. |
| 2016/0189308 | A1 * | 6/2016 | Bogovich .............. G08G 1/205 705/4 |
| 2016/0362116 | A1 | 12/2016 | Otsuka |
| 2017/0010613 | A1 | 1/2017 | Fukumoto |
| 2017/0066452 | A1 | 3/2017 | Scofield |
| 2017/0102700 | A1 | 4/2017 | Kozak |
| 2017/0234689 | A1 | 8/2017 | Gibson et al. |
| 2019/0188800 | A1 | 6/2019 | Slusar et al. |
| 2020/0317216 | A1 * | 10/2020 | Konrardy ............ B60W 30/182 |
| 2020/0327804 | A1 | 10/2020 | Xu et al. |

FOREIGN PATENT DOCUMENTS

| | | |
|---|---|---|
| WO | WO-2014139821 A1 | 9/2014 |
| WO | WO-2015129366 A1 | 9/2015 |
| WO | WO-2016109637 A1 | 7/2016 |
| WO | WO-2016200762 A1 | 12/2016 |

OTHER PUBLICATIONS

Dec. 6, 2019 (US) Final Office Action—U.S. Appl. No. 15/433,040, 29 Pages.
Mar. 21, 2019—(US) Non-Final Office Action—U.S. Appl. No. 15/433,040, 27 Pages.
May 1, 2019—(CA) Office Action—Application No. 3,014,660, 4 Pages.
May 2, 2019—(CA) Office Action—Application No. 3,014,656, 4 Pages.
Dec. 7, 2020—(EP) Examination Report—App. No. 17753747.9, 5 pages.
Jan. 9, 2020—(US) Final Office Action—U.S. Appl. No. 15/433,562, 41 pages.
Jun. 1, 2020—(CA) Office Action—Application No. 3,014,660, 4 Pages.
Jun. 1, 2020 (US) Non-Final Office Action—U.S. Appl. No. 15/433,040, 28 Pages.
Jun. 3, 2020—(CA) Office Action—Application No. 3,014,656, 6 Pages.
Nov. 4, 2020—(US) Final Office Action—U.S. Appl. No. 15/433,040, 28 Pages.
Oct. 15, 2020—(IN) First Exam Report—App. No. 201847031393, 6 pages.
Oct. 30, 2020—(US) Notice of Allowance—U.S. Appl. No. 15/433,562, 5 Pages.
Sep. 22, 2020—(IN) Office Action—App. No. 201847031419, 8 pages.
Mar. 2, 2021 (CA) Notice of Allowance—Application No. 3,014,660, 1 Page.
Mar. 30, 2021—(US) Non-Final Office Action—U.S. Appl. No. 15/433,040, 20 Pages.
Extended European Search Report for European Application No. 17753745.3 dated Jun. 14, 2019, 6 pages.
Extended European Search Report for European Application No. 17753747.9 dated Oct. 10, 2019,11 Pages.
International Preliminary Report on Patentability for International Application No. PCT/US2017/017948, mailed Aug. 30, 2018, 10 Pages.
International Preliminary Report on Patentability for International Application No. PCT/US2017/053898, mailed Apr. 11, 2019, 11 Pages.
International Search Report and Written Opinion for International Application No. PCT/US2017/017942, mailed Apr. 27, 2017, 9 Pages.
International Search Report and Written Opinion for International Application No. PCT/US2017/017948, mailed May 10, 2017, 11 Pages.
"Vehicle," Wikipedia, Published on 2016, Retrieved from URL: https://en.wikipedia.org/w/index.phptitle=Vehicle&oldid=701747451 on Mar. 6, 2019, 13 Pages.

\* cited by examiner

REAL TIME RISK ASSESSMENT AND OPERATIONAL CHANGES WITH SEMI-AUTONOMOUS VEHICLES

CROSS-REFERENCE TO RELATED APPLICATIONS

The present application is continuation of and claims priority to co-pending U.S. application Ser. No. 17/194,594, filed Mar. 8, 2021, and entitled "REAL TIME RISK ASSESSMENT AND OPERATIONAL CHANGES WITH SEMI-AUTONOMOUS VEHICLES," which is a continuation of and claims priority to U.S. application Ser. No. 15/433,562, filed Feb. 15, 2017, and entitled "REAL TIME RISK ASSESSMENT AND OPERATIONAL CHANGES WITH SEMI-AUTONOMOUS VEHICLES," which is a non-provisional of and claims priority to U.S. Provisional Application No. 62/295,385, filed Feb. 15, 2016, and entitled "REAL TIME RISK ASSESSMENT AND OPERATIONAL CHANGES WITH SEMI-AUTONOMOUS VEHICLES." Each of these applications is incorporated by reference in its entirety herein.

BACKGROUND

Many vehicles include sensors and internal computer systems designed to monitor and control vehicle operations, driving conditions, and driving functions. Advanced vehicle systems can perform such tasks as detecting and correcting a loss of traction on an icy road, self-parking, or detecting an imminent collision or unsafe driving condition and automatically making evasive maneuvers. Additionally, vehicles can include autonomous or semi-autonomous driving systems that assume all or part of real-time driving functions to operate the vehicle without real-time input.

Growth in autonomous or semi-autonomous car adoption is expected to accelerate significantly in the coming years and insurers will need to adapt quickly to the changes. Therefore, there is a benefit in the art for an enhanced method and device for calculating risks associated with vehicles operating in autonomous or semi-autonomous modes to determine insurance related costs, determine liabilities, mitigate risks, and provide drivers with proper insurance coverage.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure overcome problems and limitations of the prior art by providing a route risk mitigation system which includes real-time information to improve the safety of vehicles operating in semi-autonomous or autonomous modes. The disclosure further discloses a method for mitigating the risks associated with driving by assigning real-time risk values to road segments and then using those real-time risk values to select less risky travel routes, including less risky travel routes for vehicles engaged in autonomous driving over the travel routes.

In accordance with aspects of the disclosure, a computing system is disclosed for generating a data store (e.g., database) of risk values. The system may receive various types of information, including but not limited to accident information, geographic information, and vehicle information, and from one or more data sources. The system calculates a risk value for an associated road segment. Subsequently, the computing system may receive location information, real-time operation information, (and/or other information) and provide updated associated risk value. In an embodiment, separate risk values can be determined for vehicles engaged in autonomous driving over the road segment and vehicles engaged in manual driving over the road segment. Other features and advantages of aspects of the disclosure will be apparent from the description and drawings.

BRIEF DESCRIPTION OF THE DRAWINGS

Aspects of the disclosure may take physical form in certain parts and steps, embodiments of which will be described in detail in the following description and illustrated in the accompanying drawings that form a part hereof, wherein.

Figure 1:
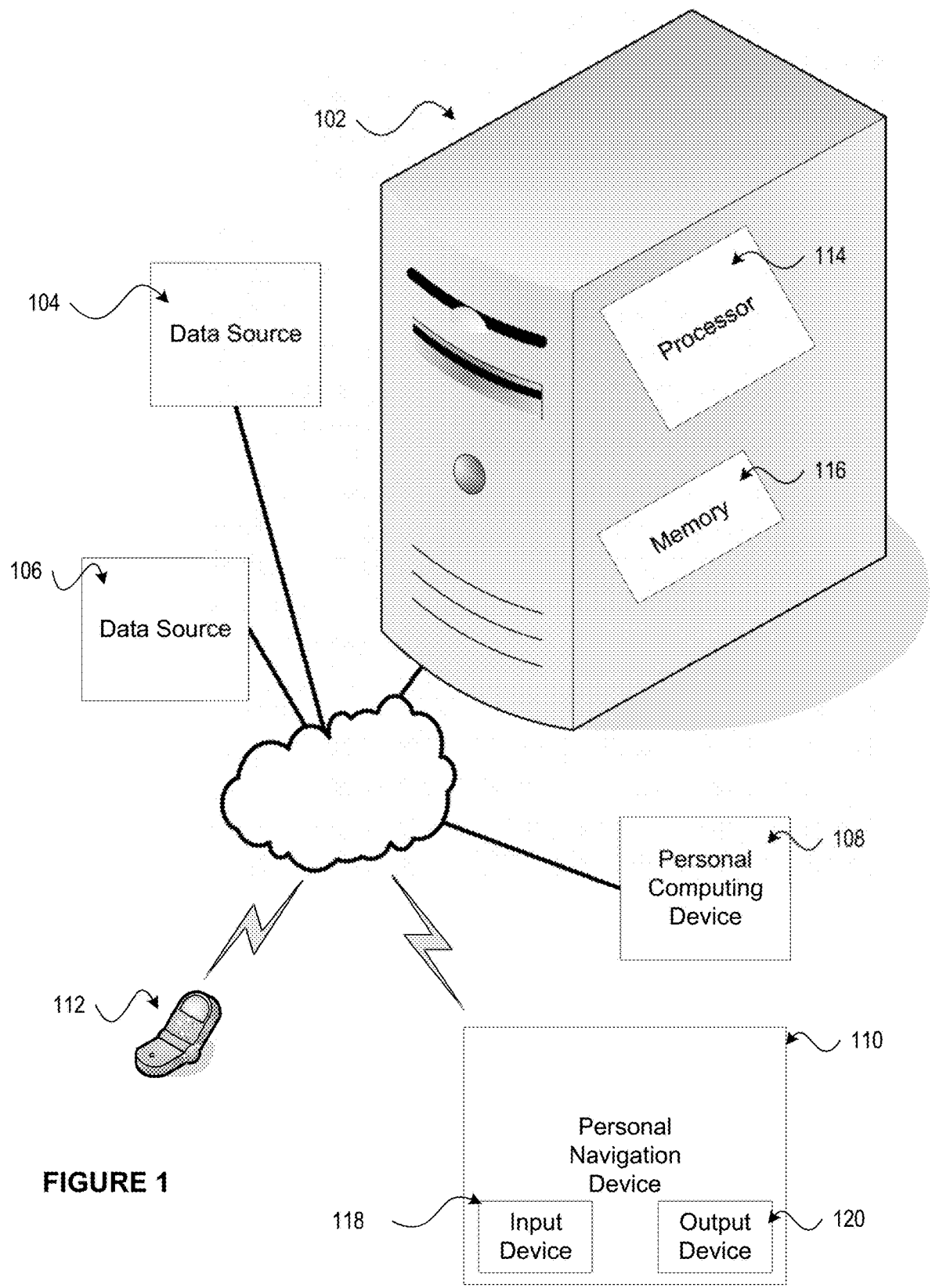
FIG. 1 depicts an illustrative operating environment in accordance with aspects of the disclosure.

It will be apparent to one skilled in the art after review of the entirety of the disclosure that the steps illustrated in the figures listed above may be performed in other than the recited order, and that one or more steps illustrated in these figures may be optional.

DETAILED DESCRIPTION

In accordance with aspects of the disclosure a route risk mitigation system is provided which includes real-time information to improve the safety of vehicles operating in semi-autonomous or autonomous modes. In an embodiment, a computing device may receive various types of information, including but not limited to accident information, geographic information, and vehicle information, and from one or more data sources. The system may calculate a risk value for an associated road segment. Subsequently, the computing system may receive location information, real-time operation information, (and/or other information) and provide an updated associated risk value. In an embodiment, separate risk values can be determined for vehicles engaged in autonomous driving over the road segment and vehicles engaged in manual driving over the road segment.

Another aspect of the disclosure provides a method and device for calculating risks associated with vehicles operating in autonomous or semi-autonomous modes to determine insurance related costs, determine liabilities, mitigate risks, and provide drivers with proper insurance coverage is disclosed. Aspects of the disclosure further disclose determining a property of an insurance policy for coverage of a semi-autonomous vehicle. The property of the insurance policy may include a premium, deductible, coverage amount, or coverage term. The property of the insurance policy may take into account a level of autonomous vehicle control capability and an ability to switch back and forth between different control modes such as a non-autonomous mode, a semi-autonomous control mode, and a fully autonomous control mode.

In another aspect of the disclosure, insurance rates for a vehicle may change on a mile by mile basis. For example, usage based insurance rates may vary from mile to mile (or fraction thereof) depending on who is controlling the vehicle, where the vehicle is operated and under what conditions the vehicle is being driven. In an embodiment, usage based insurance may be subsidized by an OEM in case of autonomous or semi-autonomous mode of vehicle operation.

In accordance with an aspect of the disclosure, a computing system may determine for various route segments whether a driver should be in control of the vehicle or whether autonomous vehicle control is recommended. In an embodiment, compliance or non-compliance with the recommendation may determine insurance rate adjustments to policy premiums or pay per mile rates. In an embodiment, compliance may be determined based on a predetermined transition time period in which a driver needs to switch control of the vehicle after issuance of a change of control recommendation. In yet another embodiment, a driver's inability to switch control for various reasons when recommended may or may not adjust liability should an accident occur depending on the reason or reasons for the driver's inability.

In accordance with aspects of the disclosure, a computing system is disclosed for generating a data store (e.g., database) of risk values. The system may receive various types of information, including but not limited to, accident information, geographic information, and vehicle operation information during all segments of a trip or on various segments of a trip. In an embodiment, the information may be used to determine liabilities at the time of an accident.

In an alternate embodiment in accordance with aspects of the disclosure, a personal navigation device, mobile device, personal computing device, and/or vehicle autonomous or semi-autonomous driving system may communicate with the database of risk values. The devices may receive information about a travel route and use that information to retrieve risk values for road segments in the travel route. The aggregate of the risk values is sent for display on a screen of the device or for recording in the memory of the device. The contents of memory may also be uploaded to a data store for use by, e.g., insurance companies, to determine whether to adjust a quote for insurance coverage or one or more aspects of current insurance coverage such as premium, specific coverages, specific exclusions, rewards, special terms, etc.

In yet another embodiment, in accordance with aspects of the disclosure, a personal navigation device, mobile device, personal computing device, and/or vehicle autonomous or semi-autonomous driving system may access the database of risk values to assist in identifying and presenting alternate low-risk travel routes. The driver, operator, or autonomous driving system may select among the various travel routes presented, taking into account risk tolerance and/or cost of insurance. Depending on the route selection, the vehicle's insurance policy may be adjusted accordingly, for either the current insurance policy or a future insurance policy.

In accordance with aspects of the disclosure, an early notification system is disclosed to alert a driver of an approaching unsafe autonomous or semi-autonomous driving zone so that a driver may switch vehicle to a non-autonomous driving mode and navigate safely through the identified location. In response to a determination of an upcoming unsafe autonomous or semi-autonomous driving zone, the driver or system may take appropriate actions in response to the early notification.

In certain embodiments, vehicle sensors, vehicle OBD, and/or vehicle communication systems, route risk determination systems disclosed herein, may collect, transmit, and/or receive data pertaining to autonomous driving of the vehicles. In autonomous driving, the vehicle fulfills all or part of the driving without being piloted by a driver. An autonomous car can be also referred to as a driverless car, self-driving car, or robot car. For example, in autonomous driving, a vehicle control computer may be configured to operate all or some aspects of the vehicle driving, including but not limited to acceleration, deceleration, steering, and/or route navigation. A vehicle with an autonomous driving capability may sense its surroundings using the vehicle sensors and/or receive inputs regarding control of the vehicle from the vehicle communications systems, including but not limited to short range communication systems, telematics, or other vehicle communication systems.

In certain embodiments, a vehicle may be driven in a semi-autonomous driving mode. A semi-autonomous driving mode may include an assist mode, a partial automation mode, a conditional automation mode, or a high automation mode.

In assist mode, a vehicle's computer-operated system may assist in emergency situations.

The system takes over either steering or acceleration in specific modes using information about the driving environment. The driver may do everything else. Exemplary autonomous features in the assisted mode may include lane keeping automation, cruise control, electronic stability control, and automatic braking.

In partial automation mode, the automation system may take control of steering and acceleration in specific driving modes using information about the driving environment. The driver may do everything else. This mode may be beneficial in low speed environments, if there are no (or very few) intersections, and the driver is alert. Exemplary autonomous features in the partial automation mode may include traffic jam assist and adaptive cruise control, in addition to or instead of the autonomous features in the assisted mode.

In conditional automation, the system may perform all (or most) aspects of the dynamic driving task in specific driving modes. The driver may be available to respond to a request by the autonomous system to intervene. For example, the driver may be present in the driver's seat but would not have to stay alert to the driving environment. Exemplary autonomous features in the conditional automation mode may include a traffic jam autopilot system, in addition to, or instead of, the autonomous features in the partial automation mode.

In high automation mode, the system may perform all aspects of the dynamic driving task in specific driving modes, even if the driver does not respond appropriately to a request to intervene. For example, a full freeway autopilot system may be used. The driver, in some circumstances, may input a desired destination but might not be expected to take an active role in driving the vehicle. Exemplary autonomous features in the high automation mode may include a full freeway autopilot system, in addition to or instead of the autonomous features in the partial automation mode.

An example of a suitable operating environment in which various aspects of the disclosure may be implemented is shown in the architectural diagram of FIG. 1. The operating environment is only one example of a suitable operating environment and is not intended to suggest any limitation as to the scope of use or functionality of the disclosures. The operating environment may be comprised of one or more data sources 104, 106 in communication with a computing device 102. The computing device 102 may use information communicated from the data sources 104, 106 to generate values that may be stored in a conventional database format. In one embodiment, the computing device 102 may be a high-end server computer with one or more processors 114 and memory 116 for storing and maintaining the values generated. The memory 116 storing and maintaining the values generated need not be physically located in the computing device 102. Rather, the memory (e.g., ROM, flash memory, hard drive memory, RAID memory, etc.) may be located in a remote data store (e.g., memory storage area) physically located outside the computing device 102, but in communication with the computing device 102. In an embodiment, the computing device 102 may be located in a vehicle or external to a vehicle.

A personal computing device 108 (e.g., a personal computer, tablet PC, handheld computing device, personal digital assistant, mobile device, etc.) may communicate with the computing device 102. Similarly, a personal navigation device 110 (e.g., a global positioning system (GPS), geographic information system (GIS), satellite navigation system, mobile device, vehicle autonomous or semi-autonomous driving system, other location tracking device, etc.) may communicate with the computing device 102. The communication between the computing device 102 and the other devices 108, 110 may be through wired or wireless communication networks and/or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 102 and other devices (e.g., devices 108, 110) may be connected to one or more of the networks via twisted pair wires, coaxial cable, fiber optics, radio waves or other media. The term "network" as used herein and depicted in the drawings should be broadly interpreted to include not only systems in which devices and/or data sources are coupled together via one or more communication paths, but also stand-alone devices that may be coupled, from time to time, to such systems that have storage capability.

In another embodiment in accordance with aspects of the disclosure, a personal navigation device 110 may operate in a stand-alone manner by locally storing some of the database of values stored in the memory 116 of the computing device 102. For example, a personal navigation device 110 (e.g., a GPS in an automobile or autonomous driving system) may be comprised of a processor, memory, and/or input devices 118 output devices 120 (e.g., keypad, display screen, speaker, etc.). The memory may be comprised of a non-volatile memory that stores a database of values used in calculating an estimated route risk for identified routes. Therefore, the personal navigation device 110 need not communicate with a computing device 102 located at, for example, a remote location in order to calculate identified routes. Rather, the personal navigation device 110 may behave in a stand-alone manner and use its processor to calculate route risk values of identified routes. If desired, the personal navigation device 110 may be updated with an updated database of values after a period of time (e.g., an annual patch with new risk values determined over the prior year).

In yet another embodiment in accordance with aspects of the disclosure, a personal computing device 108 may operate in a stand-alone manner by locally storing some of the database of values stored in the memory 116 of the computing device 102. For example, a personal computing device 108 may be comprised of a processor, memory, input device (e.g., keypad, CD-ROM drive, DVD drive, etc.), and output device (e.g., display screen, printer, speaker, etc.). The memory may be comprised of CD-ROM media that stores values used in calculating an estimated route risk for an identified route. Therefore, the personal computing device 108 may use the input device to read the contents of the CD-ROM media in order to calculate a value for the identified route. Rather, the personal computing device 108 may behave in a stand-alone manner and use its processor to calculate a route risk value. If desired, the personal computing device 108 may be provided with an updated database of values (e.g., in the form of updated CD-ROM media, over the network, etc.) after a period of time. One skilled in the art will appreciate that personal computing device 108, 110, 112 need not be personal to a single user; rather, they may be shared among members of a family, company, etc.

The data sources 104, 106 may provide information to the computing device 102. In one embodiment in accordance with aspects of the disclosure, a data source may be a computer which contains memory storing data and is configured to provide information to the computing device 102. Some examples of providers of data sources in accordance with aspects of the disclosure include, but are not limited to, insurance companies, third-party insurance data providers, autonomous vehicle operation providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of the disclosure, access to the information in the data sources 104, 106 may be restricted to only authorized computing devices 102 and for only permissible purposes. For example, access to the data sources 104, 106 may be restricted to only those persons/entities that have signed an agreement (e.g., an electronic agreement) acknowledging their responsibilities with regard to the use and security to be accorded this information.

The computing device 102 may use the information from the data sources 104, 106 to generate values that may be used to calculate an estimated route risk. Some examples of the information that the data sources 104, 106 may provide to the computing device 102 include, but are not limited to, accident information, geographic information, route information, level of autonomous vehicle implementation, driving conditions, failure to react to early warnings of route risk, failure to switch to manual mode when alerted, selecting a more risky travel route when an alternate less risky but more time consuming route was presented to the driver, and other types of information useful in generating a database of values for calculating an estimated route risk.

Some examples of accident information include, but are not limited to, loss type, applicable insurance coverage(s) (e.g., bodily injury, property damage, medical/personal injury protection, collision, comprehensive, rental reimbursement, towing), loss cost, number of distinct accidents for the segment, time relevancy validation, cause of loss (e.g., turned left into oncoming traffic, ran through red light, rear-ended while attempting to stop, rear-ended while changing lanes, sideswiped during normal driving, sideswiped while changing lanes, accident caused by tire failure (e.g., blow-out), accident caused by other malfunction of car, rolled over, caught on fire or exploded, immersed into a body of water or liquid, unknown, etc.), impact type (e.g., collision with another automobile, collision with cyclist, collision with pedestrian, collision with animal, collision with parked car, etc.), drugs or alcohol involved, pedestrian involved, wildlife involved, type of wildlife involved, speed of vehicle at time of incident, direction the vehicle was traveling immediately before the incident occurred, date of incident, time of day, night/day indicator (i.e., whether it was night or day at the time of the incident), temperature at time of incident, weather conditions at time of incident (e.g., sunny, downpour rain, light rain, snow, fog, ice, sleet, hail, wind, hurricane, etc.), road conditions at time of incident (e.g., wet pavement, dry pavement, etc.), and location (e.g., geographic coordinates, closest address, zip code, etc.) of vehicle at time of incident, whether the vehicle was engaged in autonomous or manual driving when the accident occurred.

In an embodiment, accident information can be categorized. For example, in an embodiment, accident information categories can include an accident type, cause of accident, and/or probable cause of accident. For example, a cause of accident can include loss of control of vehicle and collision with wildlife. For example, a cause of accident or probable cause of accident can include excess speed and lack vehicle traction on the road.

Accident information associated with vehicle accidents may be stored in a database format and may be compiled per road or route segment. One skilled in the art will understand that the term segment may be interchangeably used to describe a road or route segment, including but not limited to an intersection, round about, bridge, tunnel, ramp, parking lot, railroad crossing, or other feature that a vehicle may encounter along a route.

Some examples of geographic information include, but are not limited to, location information and attribute information. Examples of attribute information include, but are not limited to, information about characteristics of a corresponding location described by some location information: posted speed limit, construction area indicator (i.e., whether location has construction), topography type (e.g., flat, rolling hills, steep hills, etc.), road type (e.g., residential, interstate, 4-lane separated highway, city street, country road, parking lot, etc.), road feature (e.g., intersection, gentle curve, blind curve, bridge, tunnel), number of intersections, whether a roundabout is present, number of railroad crossings, whether a passing zone is present, whether a merge is present, number of lanes, width of road/lanes, population density, condition of road (e.g., new, worn, severely damaged with sink-holes, severely damaged with erosion, road damage with potholes, gravel, dirt, paved, etc.), wildlife area, state, county, and/or municipality. Geographic information may also include other attribute information about road segments, intersections, bridges, tunnels, railroad crossings, and other roadway features.

Location information for an intersection may include the latitude and longitude (e.g., geographic coordinates) of the geometric center of the intersection. The location may be described in other embodiments using a closest address to the actual desired location or intersection. The intersection (i.e., location information) may also include information that describes the geographic boundaries, for example, of the intersection which includes all information that is associated within a circular area defined by the coordinates of the center of the intersection and points within a specified radius of the center. In another example of location information, a road segment may be defined by the latitude and longitude of its endpoints and/or an area defined by the road shape and a predetermined offset that forms a polygon. Segments may comprise intersections, bridges, tunnels, rail road crossings or other roadway types and features. Those skilled in the art will recognize that segments can be defined in many ways without departing from the spirit of this disclosure.

Some examples of vehicle information include, but are not limited to, information that describes vehicles that are associated with incidents (e.g., vehicle accidents, etc.) at a particular location (e.g., a location corresponding to location information describing a segment, intersection, etc.) Vehicle information may include vehicle make, vehicle model, vehicle year, and age. Vehicle information may also include information collected through one or more in-vehicle devices or systems such as an event data recorder (EDR), onboard diagnostic system, global positioning satellite (GPS) device, vehicle autonomous driving system; examples of this information include speed at impact, brakes applied, throttle position, direction at impact, whether the vehicle is engaged in manual or autonomous driving.

In addition, driver behavior information may also be collected and utilized. Driver behavior information may include information about the driver of a vehicle being driven at the time of an incident. Other examples of driver information may include age, gender, marital status, occupation, alcohol level in blood, credit score, distance from home, cell phone usage (i.e., whether the driver was using a cell phone at the time of the incident), number of occupants.

In one embodiment in accordance with aspects of the disclosure, a data source 104 may provide the computing device 102 with accident information that is used to generate values (e.g., create new values and/or update existing values). The computing device 102 may use at least part of the received accident information to calculate a value, associate the value with a road segment (or other location information), and store the value in a database format. One skilled in the art will appreciate, after thorough review of the entirety of the disclosure herein, that there may be other types of information that may be useful in generating a database of values for use in, among other things, calculating an estimated route risk.

For example, in accordance with aspects of the disclosure, a data source 104 may provide the computing device 102 with geographic information that is used to generate new roadway feature risk values in a database of risk values and/or update existing risk values; where the roadway feature may comprise intersections, road segments, tunnels, bridges, or railroad crossings. Attributes associated with roadways may also be used in part to generate risk values. The computing device 102 may use at least part of the received geographic information to calculate a value, associate the value with a road segment (or other location information), and store the value in a database format. Numerous examples of geographic information were provided above. For example, a computing device 102 may receive geographic information corresponding to a road segment comprising accident information and roadway feature information and then calculate a risk value. Therefore, when calculating a risk value, the system may use, in one example, the geographic information and the accident information (if any accident information is provided). In alternative embodiments in accordance with aspects of the disclosure, the computing device may use accident information, geographic information, vehicle information, and/or other information, either alone or in combination, in calculating risk values in a database format.

The values generated by the computing device 102 may be associated with a road segment containing the accident location and stored in a data store. Similar to a point of interest (POI) stored in GPS systems, a point of risk (POR) is a road segment or point on a map that has risk information associated with it. Points of risk may arise because incidents (e.g., accidents) have occurred at these points before. In accordance with aspects of the disclosure, the road segment may be a predetermined length (e.g., ¼ mile) on a stretch of road. Alternatively, road segments may be points (i.e., where the predetermined length is minimal) on a road. Furthermore, in some embodiments, road segment may include one or more different roads that are no farther than a predetermined radius from a road segment identifier. Such an embodiment may be beneficial in a location, for example, where an unusually large number of streets intersect, and it may be impractical to designate a single road for a road segment.

Figure 2:
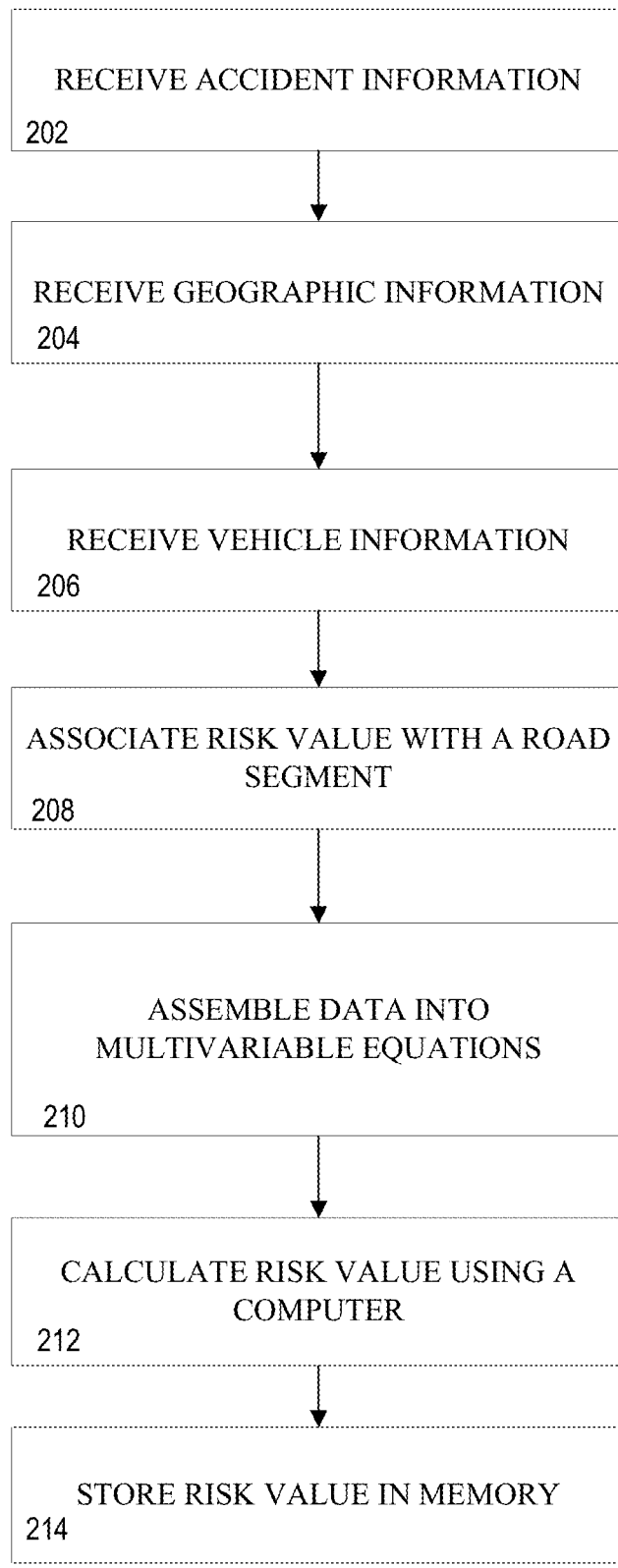
FIG. 2 depicts illustrative steps for calculating the risk value of a route segment by applying actuarial and/or statistical methods in accordance with aspects of the disclosure.

Referring to FIG. 2, in accordance with aspects of the disclosure, a computing device 102 may receive accident information (in step 202), geographic information (in step 204), and/or vehicle information (in step 206). The computing device 102 may calculate (in step 212) the risk value for a road segment (or point of risk) by applying actuarial techniques to the information that may be received from data sources 104, 106. In one embodiment, the computing device 102 receives and stores the accident information in a data store with the latitude/longitude and time of the incident. The accident data is associated with a location and combined with other accident data associated with the same location (in step 210). Applying actuarial and/or statistical modeling techniques involving multiple predictors, such as generalized linear models and non-linear models, a risk value may be calculated (212), and the calculated risk value may be recorded in memory (116) (in step 214). The multiple predictors involved in the statistical model used to calculate a risk value may include accident information, geographic information, and vehicle information, including whether the vehicle was operating autonomously or manually at the time of the accident. Associating the risk value (in step 208) with a line segment and/or point which best pinpoints the area of the road in which the incident(s) occurred may be accomplished by using established GIS locating technology (e.g., GPS ascertaining a geographically determinable address, and assigning the data file to a segment's or intersection's formal address determined by the system). For example, two or more accidents located in an intersection or road segment may have slightly different addresses depending on where within the intersection or segment the accident location was determined to be. Therefore, the system may identify a location based on business rules. In another example, business rules may identify an incident location using the address of the nearest intersection. In yet another example, the system may identify the location of an incident on a highway using segments based on mileage markers or the lengths may be dynamically determined by creating segment lengths based on relatively equal normalized risk values. Therefore, roadways that have stretches with higher numbers of accidents may have shorter segments than stretches that have fewer accidents. In another example, if the incident occurred in a parking lot, the entire parking lot may be associated with a formal address that includes all accidents located within a determined area. One skilled in the art will appreciate after review of the entirety of the disclosure that road segment includes a segment of road, a point on a road, and other designations of a location (e.g., an entire parking lot).

For example, an insurance claim-handling processor may collect data about numerous incidents such as collision, theft, weather damage, and other events that cause any one of (or combination of) personal injury, vehicle damage, and damage to other vehicles or property. Information about the accident may be collected through artifacts such as first notice of loss (FNOL) reports and claim adjuster reports and may be stored in one or more data stores used by the insurer. Other data may also be collected at the point and time when the incident occurred, and this information (e.g., weather conditions, traffic conditions, vehicle speed, etc.) may be stored with the other accident information. The information in these data stores may be distributed by data sources 104, 106 in accordance with aspects of the disclosure. In addition, some information may also be recorded in third-party data sources that may be accessible to one or more insurance companies. For example, traffic information (e.g., traffic volume) and weather information may be retrieved in real-time (or near real-time) from their respective data sources.

Figure 3:
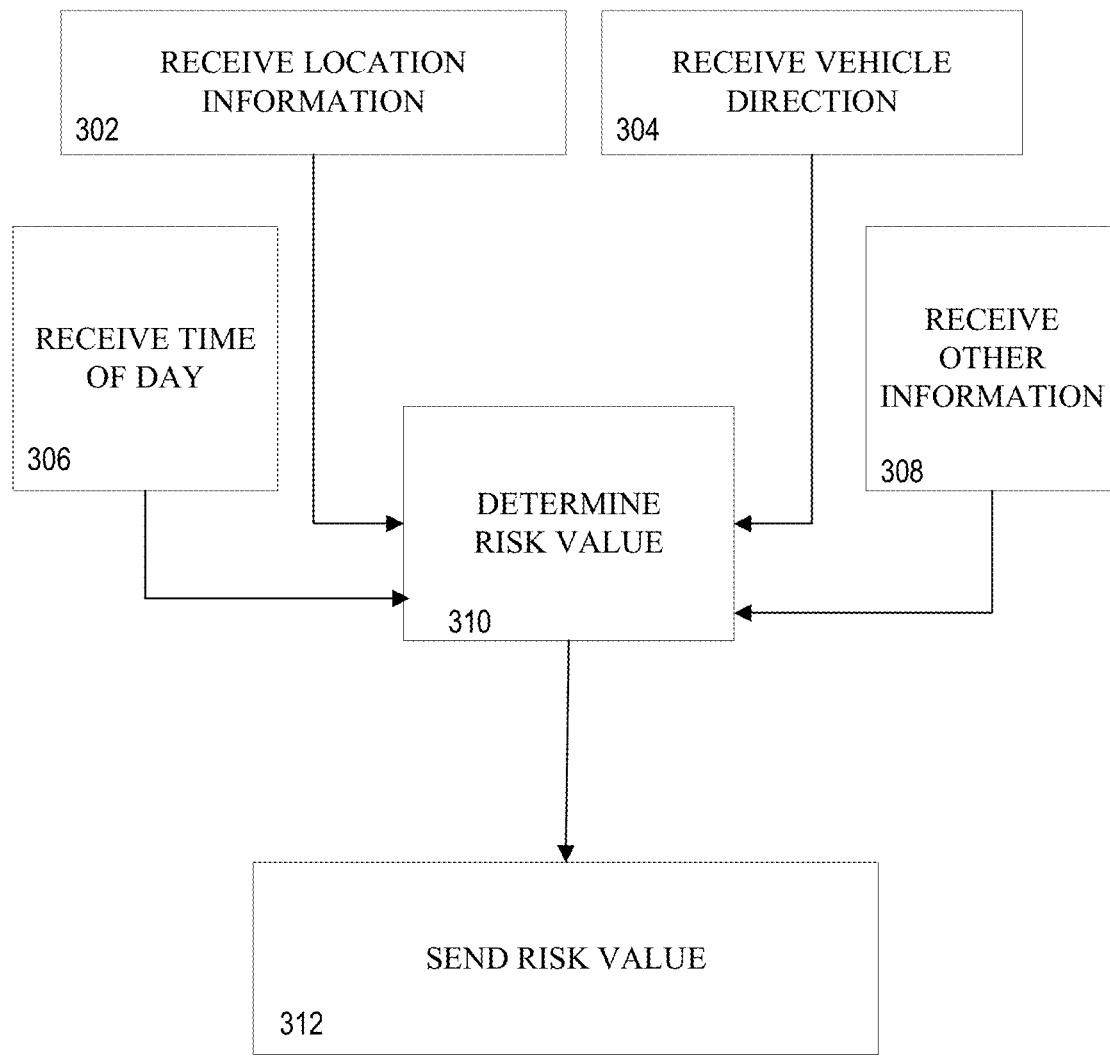
FIG. 3 depicts illustrative steps for determining and providing risk values to a computing device in accordance with aspects of the disclosure.

Referring to FIG. 3, in accordance with aspects of the disclosure, the computing device 102 may send (in step 312) the risk value corresponding to a road segment when it receives location information (in step 302) requesting the risk associated with a particular location. The particular location information may be in the form of longitude/latitude coordinates, street address, intersection, closest address, or other form of information. Furthermore, in an alternative embodiment, the accuracy of the risk value may be improved by submitting the direction that a vehicle travels (or may travel) through a road segment. The computing device 102 may receive (in step 304) the vehicle direction and use it to determine the risk value associated with the vehicle route. For example, a dangerous intersection demonstrates high risk to a vehicle/driver that passes through it. However, actuarial analysis (e.g., of data showing many recorded accidents at the location) may show that it is more dangerous if the driver is traveling northbound on the road segment and turns left. Therefore, the vehicle direction may also be considered when retrieving the appropriate risk value (in step 310).

Likewise, the computing device 102 may also receive (in step 308) other information to enhance the accuracy of the risk value associated with a travel route. For example, the computing device 102 may receive (in step 306) the time of day when the driver is driving (or plans to drive) through a particular travel route. This information may improve the accuracy of the risk value retrieved (in step 310) for the travel route. For example, a particular segment of road through a wilderness area may have a higher rate of accidents involving deer during the night hours, but no accidents during the daylight hours. Therefore, the time of day may also be considered when retrieving the appropriate risk value (in step 310). In addition, the computing device may receive (in step 308) other information to improve the accuracy of the risk value retrieved (in step 310) for a travel route. Some examples of this other information include, but are not limited to, the vehicle's speed (e.g., a vehicle without a sport suspension attempting to take a dangerous curve at a high speed), vehicle's speed compared to the posted speed limit, etc.

In accordance with aspects of the disclosure, a computer-readable medium storing computer-executable instructions for performing the steps depicted in FIGS. 2 and 3 and/or described in the present disclosure is contemplated. The computer-executable instructions may be configured for execution by a processor (e.g., processor 114 in computing device 102) and stored in a memory (e.g., memory 116 in computing device 102). Furthermore, as explained earlier, the computer-readable medium may be embodied in a non-volatile memory (e.g., in a memory in personal navigation device 110) or portable media (e.g., CD-ROM, DVD-ROM, USB flash, etc. connected to personal computing device 108).

In accordance with aspects of the disclosure, a personal navigation device 110 may calculate a route risk value for a travel route of a vehicle. The personal navigation device 110 may be located, for example, in a driver's vehicle, as a component of an autonomous driving system, or in a mobile device 112 with location tracking capabilities. Alternatively, a personal computing device 108 may be used to calculate the route risk value for a travel route of a vehicle.

Figure 4:
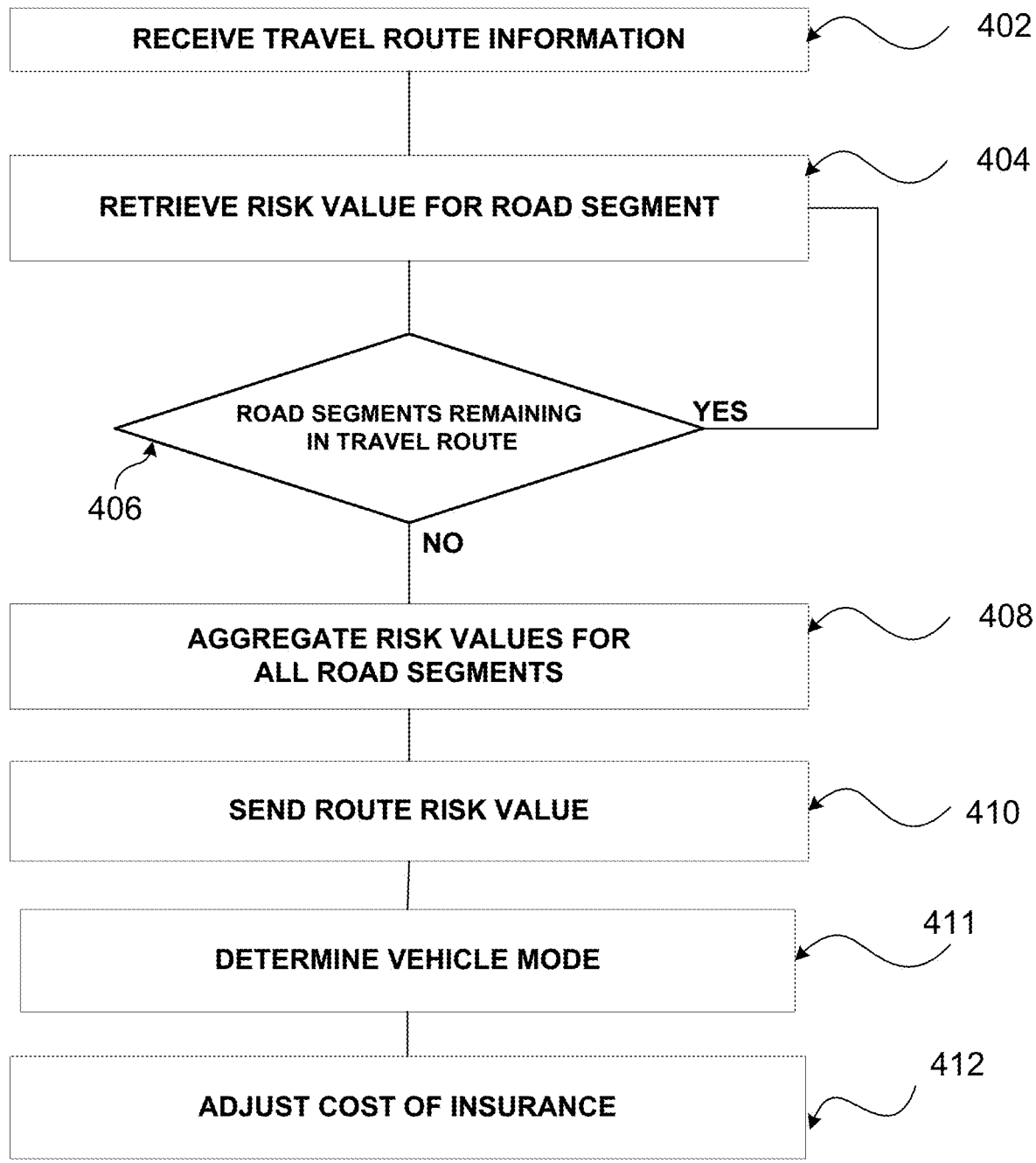
FIG. 4 depicts illustrative steps for calculating the risk value of a travel route in accordance with aspects of the disclosure.

For example, referring to FIG. 4, a personal navigation device 110 may receive (in step 402) travel route information. The travel route information may include, but is not limited to, a start location, end location, road-by-road directions, and/or turn-by-turn directions. The personal navigation device 110 may use the travel route information and mapping software to determine the road segment upon which the vehicle will travel, and retrieve (in step 404) the risk value for that road segment. For each subsequent road segment remaining in the travel route (see step 406), the personal navigation device 110 may access the database of risk values to retrieve (in step 404) the risk value for that road segment. As explained earlier, the database of risk values may be stored locally to the personal navigation device 110, or may be stored remotely and accessed through a wired/wireless link to the data store.

The risk values retrieved (in step 404) for the travel route may be aggregated (in step 408) and a total risk value for the travel route may be sent (in step 410). In an alternate embodiment, the computing device 102 may count the number of each type of road risk along the travel route based on the values stored in the database. This number may then be multiplied by a risk-rating factor for the respective risk type. A risk type may comprise intersections, locations of past accidents along a route, railroad crossings, merges, roadway class (residential, local, commercial, rural, highways, limited access highways). Other risk types may include proximity to businesses that sell alcohol, churches or bingo parlors.

The sum of this product over all risk types may, in this alternate embodiment, equal the total route risk value. The total route risk value may be divided by the distance traveled to determine the route risk category for the travel route. For example, a route risk category may be assigned based on a set of route risk value ranges for low, medium, and high risk routes.

After being aggregated, the total risk value may be sent (in step 410) to a viewable display on the personal navigation device 110. Alternatively, the total risk value may be sent (in step 410) to a local/remote memory where it may be recorded and/or monitored. For example, it may be desirable for a safe driver to have her total risk value for all travel routes traveled over a time period to be uploaded to an insurance company's data store.

In step 411, personal navigation device 110 or other device may determine whether the vehicle is currently being driven in autonomous, semi-autonomous mode, or non-autonomous mode.

The insurance company may then identify the driver as a lower-risk driver (e.g., a driver that travels on statistically lower-risk routes in the recommended driving mode during lower-risk times) and provide the driver/vehicle with a discount and/or credit (in step 412) on an existing insurance policy (or towards a future insurance policy). At least one benefit of the aforementioned is that safe drivers and/or operators having safe autonomous driving systems are rewarded appropriately, while high-risk drivers and operators of autonomous vehicles are treated accordingly.

In some embodiments in accordance with aspects of the disclosure, the route risk value sent (in step 410) may be in the form of a number rating the risk of the travel route (e.g., a rating of 1 to 100 where 1 is very low risk and 100 is very high risk). Alternatively, the route risk value may be in the form of a predetermined category (e.g., low risk, medium risk, and high risk). At least one benefit of displaying the route risk value in this form is the simplicity of the resulting display for the driver. For example, an enhanced GPS unit may display a route (or segment of a route) in a red color to designate a high risk route, and a route may be displayed in a green color to designate a lower risk route. At least one benefit of a predetermined category for the route risk value is that it may be used as the means for comparing the amount of risk associated with each travel route when providing alternate routes. In addition, the enhanced GPS unit may alert the driver of a high risk road segment and offer the driver an incentive (e.g., monetary incentive, points, etc.) for avoiding that segment.

In accordance with aspects of the disclosure, a computer-readable medium storing computer-executable instructions for performing the steps depicted in FIGS. 4 and/or described in the present disclosure is contemplated. The computer-executable instructions may be configured for execution by a processor (e.g., a processor in personal navigation device 110) and stored in a memory (e.g., flash memory in device 110).

In accordance with aspects of the disclosure, a computing device 102 may receive real-time accident information, geographic information, and/or vehicle information and determine liability for the accident. In an embodiment, liability for the accident may be assigned to a single party such as the driver or may be shared among multiple parties. For example, in an autonomous vehicle setting where the autonomous vehicle was in control of driving, the OEM of the equipment may be liable if the autonomous vehicle equipment fails and an accident is caused due to the failure of the OEM equipment. In another embodiment, a government agency or private entity may be liable if the accident was caused by negligence on the part of a government agency or private entity (i.e. road surface not properly maintained).

In another embodiment, computing device 102 may determine based on received data that a driver failed to take control of the vehicle when required or failed to react to early warning signs of route risk. In such a scenario, computing device 102 based on all received data may determine that the driver is liable for an accident.

In another embodiment, computing device 102 may determine that liability is to be shared among multiple different entities along a sliding scale. For instance, computing device 102 may determine that liability for damage should be shared among several entities depending upon autonomous level of the vehicle at and before the accident.

Figure 5:
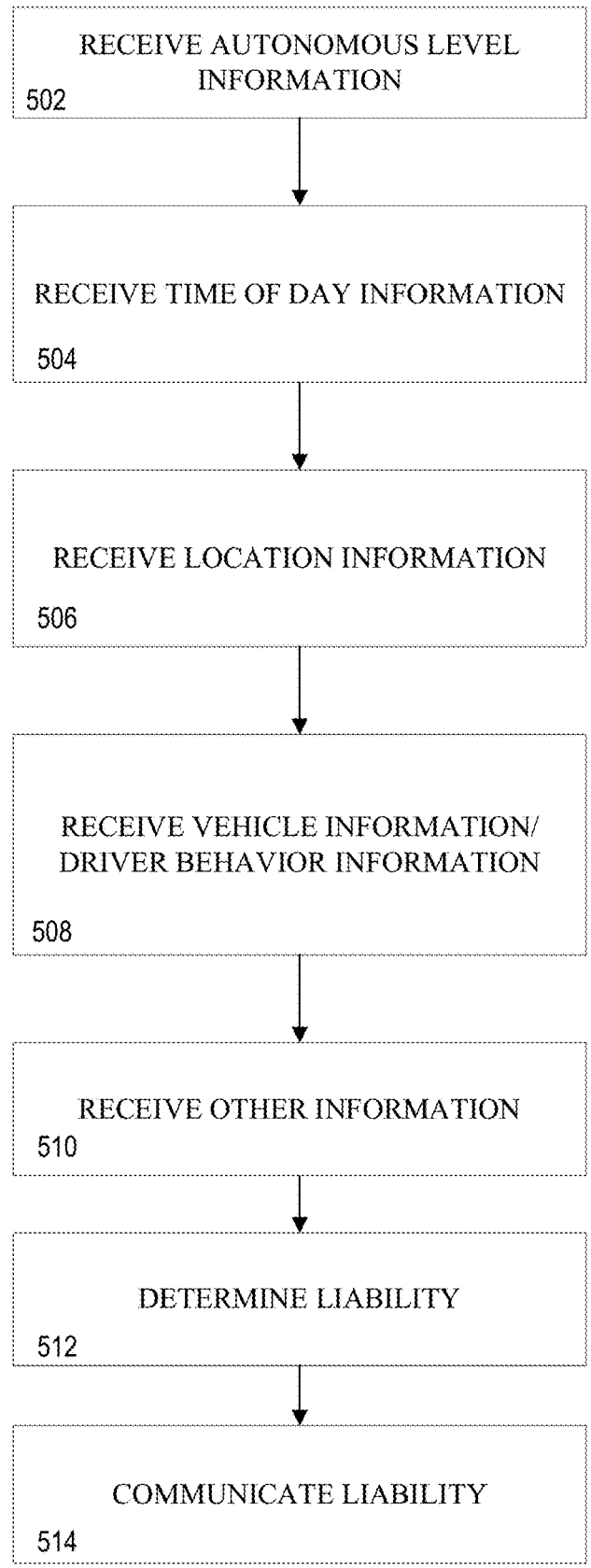
FIG. 5 depicts illustrative steps for determining liability for an accident in accordance with aspects of the disclosure.

Referring to FIG. 5, in accordance with aspects of the disclosure, the computing device 102 may receive (in step 502) information regarding who is in control of the vehicle at a given point of time during a trip segment. For example, computing device 102 may receive autonomous level information corresponding to which mode of control is utilized (non-autonomous control mode, semi-autonomous control mode, or fully autonomous control mode.) during various segments of a trip. In another embodiment involving a multi-vehicle accident, computing device 102 may receive information from all or some of the vehicles involved, the information may include autonomous level information for each of the involved vehicles.

The computing device 102 may receive (in step 504) the time of day when the driver is driving through a particular travel route. This information may be used in the determination of liability. For example, driving at night without lights would increase chances of having an accident due to decreased visibility of the road.

The computing device 102 may receive (in step 506) location information regarding the vehicle associated with an accident. The particular location information may be in the form of longitude/latitude coordinates, street address, intersection, closest address, or other form of information. In an embodiment, the location information may also include vehicle direction of travel just prior to any accident.

The computing device 102 may also receive (in step 508) vehicle information and/or driver behavior information. Some examples of vehicle information include, but are not limited to, vehicle make, vehicle model, vehicle year, and age. Vehicle information may also include information collected through one or more in-vehicle devices or systems such as an event data recorder (EDR), onboard diagnostic system, vehicle autonomous driving system; examples of this information include speed at impact, brakes applied, throttle position, direction at impact, whether the vehicle is engaged in manual or autonomous driving.

Driver behavior information may include information about the driver of a vehicle being driven at the time of an incident. Other examples of driver information may include age, gender, marital status, occupation, alcohol level in blood, credit score, distance from home, cell phone usage (i.e., whether the driver was using a cell phone at the time of the incident), number of occupants. In another embodiment involving a multi-vehicle accident, computing device 102 may receive information from all or some of the vehicles involved, the information may include vehicle information associated with each of the involved vehicles.

In addition, computing device 102 may receive (in step 510) other information to improve the accuracy of any determined liability. Some examples of this other information include, but are not limited to, the vehicle's speed (e.g., a vehicle without a sport suspension attempting to take a dangerous curve at a high speed), vehicle's speed compared to the posted speed limit, etc. Other examples of other information that may be received include the determination of risk values and accident information.

Computing device 102 may (in step 512) determine liability for an accident. The determination of liability may be allocated to more than one party in various percentages. For example, liability may be allocated among multiple parties, including (1) the driver, (2) other driver or drivers, (3) owner of vehicle, (4) pedestrians, (5) manufacturers (or servicers) of malfunctioning autonomous features (e.g., malfunctioning autonomous steering, braking, and/or speed control), (6) manufacturers (or servicers) of malfunctioning roadway infrastructure and/or (7) third parties that illegally accesses (e.g., hack) the vehicle's autonomous driving system.

Computing device 102 may (in step 514) communicate liability for an accident to all interested parties. The liability information may be used to determine or update usage based insurance premiums or policies for semi-autonomous vehicles.

In some aspects, a driver may be primarily liable if the driver overrides the autonomous system or automated system warnings and causes an accident by initiating manual driving features. The manufacturer of an autonomous feature (e.g., autonomous steering) may be liable if the autonomous feature malfunctions and causes an accident. No-fault coverage may be used if an "Act of God," such as severe weather or other interference, confuses the sensors in the vehicle, causing an accident during autonomous driving mode.

When retrieving risk values, in accordance with aspects of the disclosure, one or more techniques, either alone or in combination, may be used for identifying and calculating the appropriate risk value for road segments. For example, under an accident cost severity rating (ACSR) approach, each point of risk has a value which measures how severe the average accident is for each point of risk. The value may be normalized and/or scaled by adjusting the range of the values. For example, under an ACSR approach using a range of values from 1 to 10: considering all accidents that occur in a predetermined area (e.g., road segment, state, zip code, municipality, etc.), the accidents in the top ten percentile of expensive accidents in that territory would get a 10 value and the lowest 10 percentile of costly accidents in that region would get a 1 value. The actual loss cost may be calculated by summing the various itemized loss costs (e.g., bodily injury, property damage, medical/personal injury protection, collision, comprehensive, uninsured/underinsured motorist, rental reimbursement, towing, etc.).

In an alternate embodiment, the ACSR approach may attribute varying weights to the different types of loss costs summed to calculate the actual loss cost. For example, after analyzing the information, certain portions of a loss cost (e.g., medical cost) may indicate risk more accurately than others. The importance of these portions may be weighted more heavily in the final loss cost calculation. Actuarial methods may be used to adjust loss cost data for a segment where a fluke accident may cause the calculated risk value to far exceed the risk value based on all the other data.

Under the accidents per year (APYR) approach, in accordance with aspects of the disclosure, each point of risk has a risk value that may reflect the average number of accidents a year for that individual point of risk. Under a modified APYR approach, the risk value for a point of risk continues to reflect the average number of accidents a year, but attributes a lesser weight to accidents that occurred a longer time ago, similar to time relevancy validation (e.g., it gives emphasis to recent accident occurrences over older occurrences).

Under the risk severity (RSR) approach, in accordance with aspects of the disclosure, each point of risk has a risk value that may reflect the severity of risk for that individual point of risk. For example, an intersection that is a frequent site of vehicle accident related deaths may warrant a very high risk value under the RSR approach. In one embodiment, risk severity rating may be based on accident frequency at intersections or in segments over a determined period of time. In another embodiment, the rating may be based on loss costs associated to intersections and segments. Yet another embodiment may combine accident frequency and severity to form a rating for a segment or intersection. One skilled in the art can recognize that risk severity ratings may be based on one or a combination of factors associated with intersections or segments.

Under the Environmental Risk Variable (ERV) approach, in accordance with aspects of the disclosure, each point of risk has a risk value that may reflect any or all information that is not derived from recorded accidents and/or claims, but that may be the (direct or indirect) cause of an accident. In one embodiment, the risk value under the ERV approach may be derived from vehicle information transmitted by a data source 104, 106. In an alternate embodiment, the EVR approach may use compound variables based on the presence or absence of multiple risk considerations which are known to frequently, or severely, cause accidents. A compound variable is one that accounts for the interactions of multiple risk considerations, whether environmental or derived from recorded accidents and/or claims. For example, driving through a wildlife crossing zone at dusk would generate a greater risk value than driving through this same area at noon. The interaction of time of day and location would be the compound variable. Another example may consider current weather conditions, time of day, day of the year, and topography of the road. A compound variable may be the type of infrequent situation which warrants presenting a verbal warning to a driver (e.g., using a speaker system in a personal navigation device 110 mounted in a vehicle) of a high risk route (e.g., a high risk road segments).

Another possible approach may be to calculate the route risk value using one or more of the approaches described above divided by the length of the route traveled. This may provide an average route risk value for use in conjunction with a mileage rating plan. In one embodiment, the system combines route risk and conventional mileage data to calculate risk per mile rating.

In one embodiment, a device in a vehicle (e.g., personal navigation device 110, mobile device 112, etc.) may record and locally store the route and/or the route and time during which a route was traveled. This travel route information may be uploaded via wireless/wired means (e.g., cell phones, manually using a computer port, etc.). This travel route information may be used to automatically query a data source 104, 106 for route rating information and calculate a total risk value.

Some accident data may be recorded and locally stored on a device (e.g., personal navigation device 110, mobile device 112, etc.) that provides incident location and a timestamp that can be used to synchronize other data located in data sources 104 and 106. The captured information may be periodically uploaded to computing device 102 for further processing of accident data for updating the road segment database in memory 116. In some embodiments, the other data may include local weather conditions, vehicle density on the roadway, and traffic signal status. Additional information comprising data from an in-vehicle monitoring system (e.g., event data recorder or onboard diagnostic system) may record operational status of the vehicle at the time of the incident. Alternatively, if the vehicle did not have a location tracking device, an insurance claims reporter may enter the address and other information into the data source manually. If the vehicle was configured with an in-vehicle monitoring system that has IEEE 802.11 Wi-Fi capabilities (or any other wireless communication capabilities), the travel route information may be periodically uploaded or uploaded in real-time (or near real-time) via a computer and/or router. The in-vehicle monitoring system may be configured to automatically upload travel route information (and other information) through a home wireless router to a computer. In some advanced monitoring systems, weather and traffic data (and other useful information) may be downloaded (in real-time or near real-time) to the vehicle. In some embodiments, it may be desirable to use mobile devices 112 (with the requisite capabilities) to transmit the information, provide GPS coordinates, and stream in data from other sources.

The risk types described above may be variables in a multivariate model of insurance losses, frequencies, severities, and/or pure premiums. Interactions of the variables would also be considered. The coefficient the model produces for each variable (along with the coefficient for any interaction terms) would be the value to apply to each risk type. The personal navigation device 110 may initially provide the quickest/shortest route from a start location A to an end location B, and then determine the route risk value by determining either the sum product of the number of each risk type and the value for that risk type or the overall product of the number of each risk type and the value for that risk type. (Traffic and weather conditions could either be included or excluded from the determination of the route risk value for comparison of routes. If not included, an adjustment may be made to the route risk value once the route has been traveled). The driver may be presented with an alternate route which is less risky than the initial route calculated. The personal navigation device 110 may display the difference in risk between the alternate routes and permit the driver to select the preferred route. In some embodiments in accordance with the disclosure, a driver/vehicle may be provided a monetary benefit (e.g., a credit towards a future insurance policy) for selecting a less risky route.

In one example in accordance with aspects of the disclosure, a driver may enter a starting location and an end location into a personal navigation device 110, including a personal navigation device of an autonomous driving system. The personal navigation device 110 may present the driver with an illustrative 2-mile route that travels on a residential road near the following risks: 5 intersections, 3 past accident sites, 1 railroad crossing, and 1 lane merging site. Assuming for illustrative purposes that the following risk values apply to the following risk types:

| Risk Type | Risk-rating Factor |
|---|---|
| Intersections | 55 |
| Past Accidents | 30 |
| Railroad Crossing | 5 |
| Merge | 60 |
| Residential Road | 2 per mile |

Then, the route risk value for the entire 2-mile route may be calculated, in one embodiment of the disclosure, as follows:

| Risk Type | Risk-rating Factor | Count | Product |
|---|---|---|---|
| Intersections | 55 | 5 | 55 * 5 = 275 |
| Past Accidents | 30 | 3 | 30 * 3 = 90 |
| Railroad Crossing | 5 | 1 | 5 * 1 = 5 |
| Merge | 60 | 1 | 60 * 1 = 60 |
| Residential Road | 2 per mile | 2 | 2 * 2 = 4 |
| Sum Total | | | 434 |

Assuming a route risk value between 0 and 350 (per mile) is categorized as a low-risk route, then the aforementioned 2-mile route's risk value of 217 (i.e., 434 divided by 2) classifies it a low-risk route.

In some embodiments, for rating purposes the route risk value may consider the driving information of the driver/vehicle. For example, the personal navigation device 110 (or other device) may record the route taken, as well as the time of day/month/year, weather conditions, traffic conditions, and the actual speed driven compared to the posted speed limit. The current weather and traffic conditions may be recorded from a data source 104, 106. Weather conditions and traffic conditions may be categorized to determine the risk type to apply. The posted speed limits may be included in the geographic information. For each segment of road with a different posted speed limit, the actual speed driven may be compared to the posted speed limit. The difference may be averaged over the entire distance of the route. In addition, various techniques may be used to handle the amount of time stopped in traffic, at traffic lights, etc. One illustrative technique may be to only count the amount of time spent driving over the speed limit and determine the average speed over the speed limit during that time. Another illustrative method may be to exclude from the total amount of time the portion where the vehicle is not moving. Then, upon completion of the trip, the route risk value may be calculated and stored in memory along with the other information related to the route risk score and mileage traveled. This information may later be transmitted to an insurance company's data store, as was described above.

In another embodiment in accordance with aspects of the disclosure, real time data may be used to dynamically assign risk values to each point of risk. For example, some road segments may have a higher risk value when a vehicle travels through at a time when, e.g., snowfall is heavy. In such situations, a dynamic risk value may be applied to the road segment to determine the appropriate route risk value to assign to the route.

Figure 6:
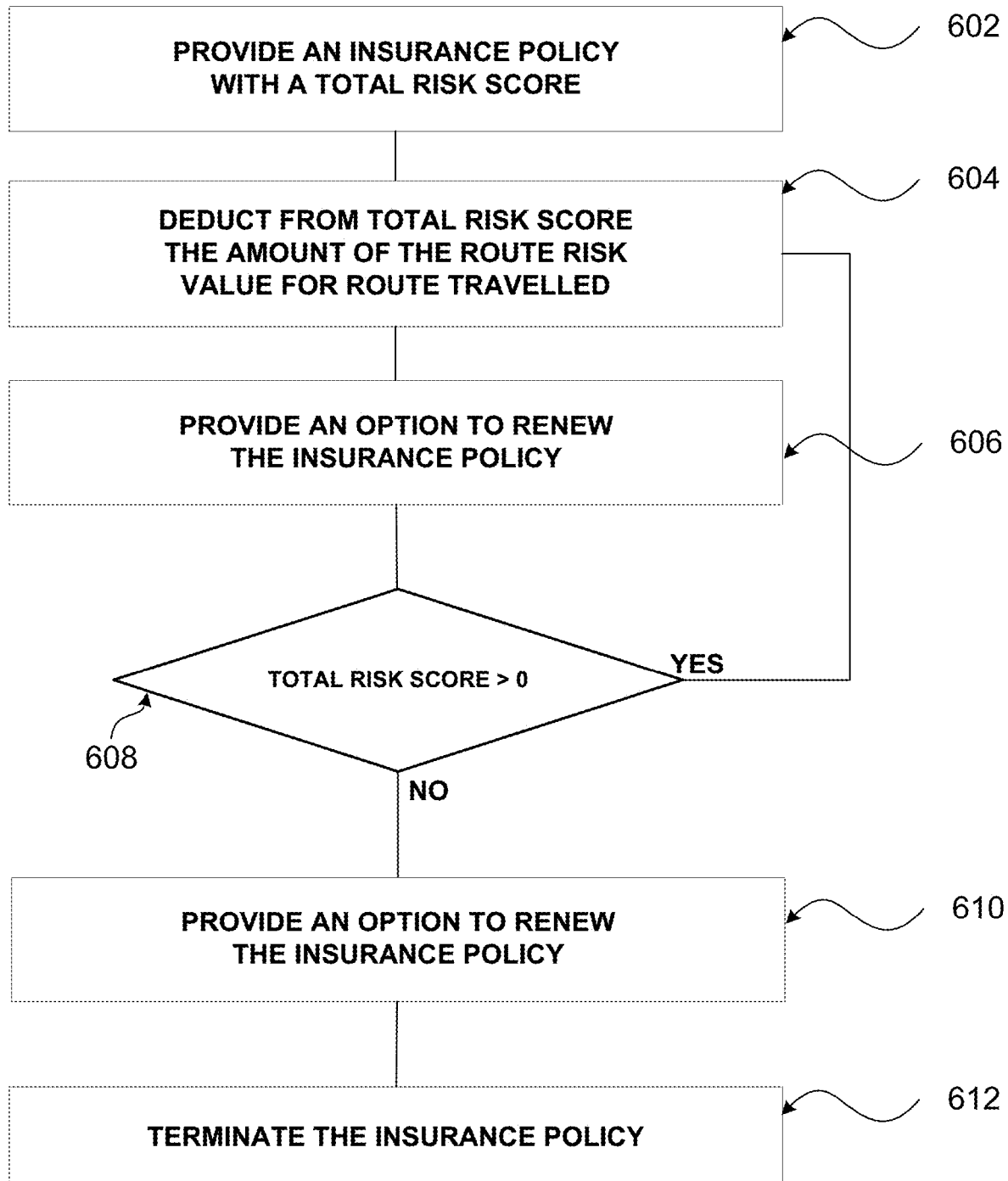
FIG. 6 depicts illustrative steps for providing an insurance policy based on risk consumption in accordance with aspects of the disclosure.

Referring to FIG. 6, in accordance with aspects of the disclosure, a method of selling a vehicular insurance policy is illustrated. A vehicle owner or driver may be provided (in step 602) with an insurance policy with a total risk score. The total risk score (e.g., 500) indicates the quantity of risk the vehicle is permitted to travel through before the insurance policy must be renewed or becomes terminated. For example, as the vehicle is driven over various travel routes, the route risk values for the road segments traveled are deducted (in step 604) from the total risk score of the insurance policy. The vehicle owner and/or driver may be provided (in step 606) an option to renew the insurance policy (e.g., to purchase additional risk points to apply towards the total risk score of the insurance policy). Once the total risk score falls to zero or under (see step 608), the vehicle owner and/or driver (or any other person/entity authorized to renew the policy) is provided (in step 610) with a final option to renew the insurance policy before the insurance policy terminates (in step 612). It will be apparent to one skilled in the art after review of the entirety of the disclosure that the embodiment illustrated above may benefit from a personal navigation device 110 (or similar device) to monitor and record the route traveled by a vehicle. At least one benefit of the insurance policy illustrated by FIG. 6 is the ability to pay per quantity of risk consumed instead of paying only a fixed premium.

In another embodiment in accordance with aspects of the disclosure, route-dependent pricing uses route risk values to adjust insurance pricing based on where a vehicle is driven. Contrary to the embodiment above where the vehicle's insurance policy terminated dependent on the quantity of risk consumed by the vehicle's travel route, in this embodiment, an insurance company (or its representatives, e.g., agent) may adjust the price quoted/charged for an insurance policy based on risk consumed. In this embodiment, a vehicle/driver may be categorized into a risk class (e.g., low-risk, medium-risk, high risk, etc.) and charged for insurance accordingly. For example, the vehicle/driver may be provided with notification of a credit/debit if the vehicle consumed less/more, respectively, of risk at the end of a policy term than was initially purchased.

In another embodiment: the insurance policy is sold and priced in part based on where a customer falls within a three sigma distribution of risk units consumed by all insured per a typical policy period. The policy pricing may be based on an initial assumption of risk to be consumed in the prospective policy period or may be based on risk consumed in a preceding policy period. In a case where the number of risk units consumed is greater than estimated, the customer may be billed for the overage at the end of (or during) the policy period. In yet another embodiment, the system may be provided as a pay-as-you-drive coverage where the customer is charged in part based on the actual risk units consumed in the billing cycle. The system may include a telematics device that monitors, records, and periodically transmits the consumption of risk units to processor 114 that may automatically bill or deduct the cost from an account.

Figure 7:
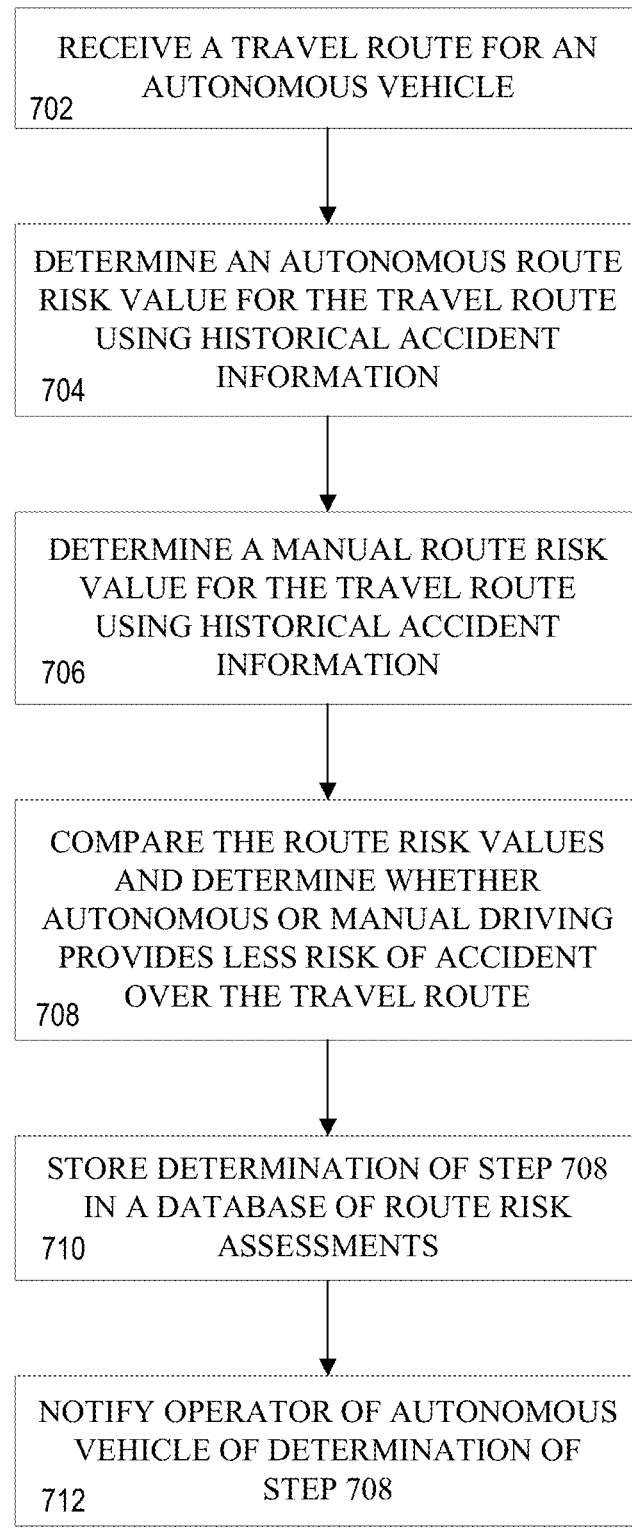
FIG. 7 depicts illustrative steps for analyzing historical accident information to determine whether autonomous or manual driving over a travel route provides less risk of accident.

Referring to FIG. 7, in another embodiment, an analysis of historical accident information can be performed to determine whether autonomous or manual driving over a travel route provides less risk of accident. In an embodiment, a travel route for an autonomous vehicle is received by the system (step 702). An analysis of historical accident information is performed for the travel route. The analysis includes identifying accident information for vehicles engaged in autonomous driving over the travel route and accident information for vehicles engaged in manual driving over the travel route. An autonomous route risk value for the travel route is determined using historical accident information of autonomous vehicles engaged in autonomous driving over the travel route (step 704). A manual route risk value for the travel route is determined using historical accident information for vehicles engaged in manual driving over the travel route (step 706). The autonomous route risk value and the manual route risk value is compared to determine whether autonomous driving or manual driving provides less risk of accident over the travel route (step 708). The determination for the travel route can be stored in a database (step 710) for use in, for example, future risk assessments of the travel route, making driving determinations for an autonomous vehicle over the travel route, and/or making manual driving decisions over the travel route. For example, in an embodiment, the determination of whether autonomous or manual driving provides less risk of accident over the travel route can be sent in a notification to the driver/operator of the autonomous vehicle (step 712).

Figure 8:
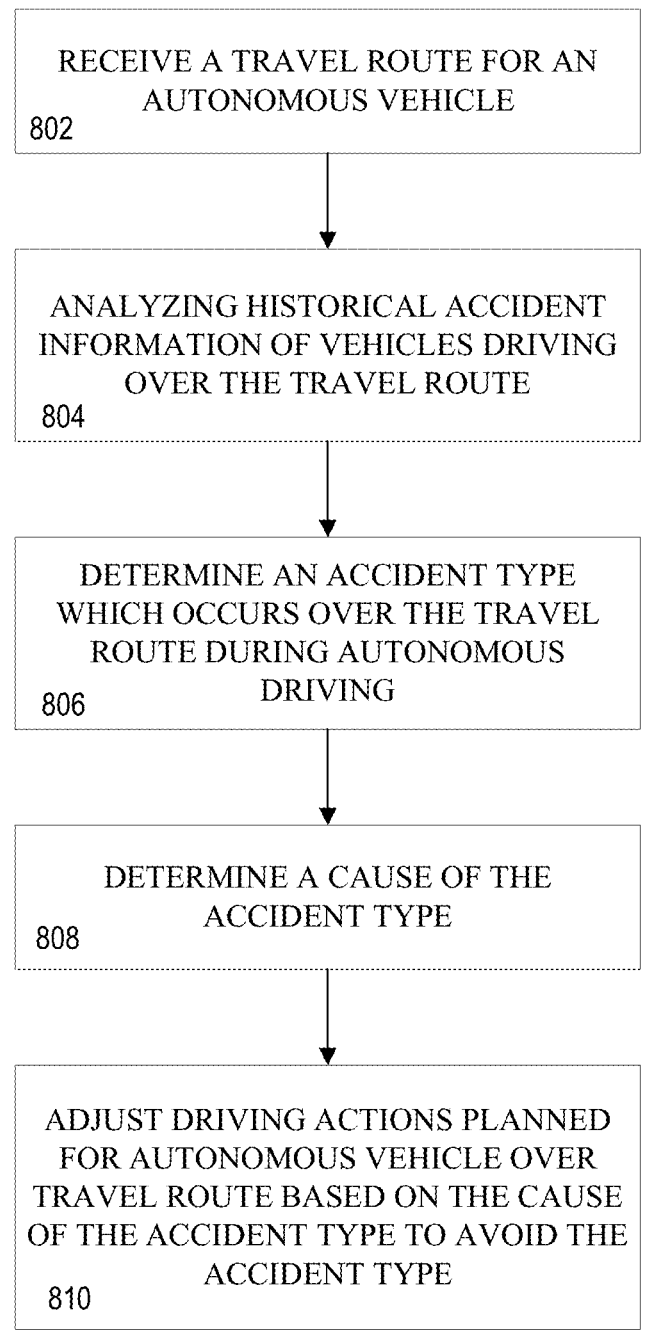
FIG. 8 depicts illustrative steps for analyzing historical accident information to adjust driving actions of an autonomous vehicle over a travel route in order to avoid accidents which have occurred over the travel route.

Referring to FIG. 8, in an embodiment, historical accident information can be used to adjust driving actions of an autonomous vehicle over a travel route in order to avoid accidents which have occurred over the travel route. In an embodiment, a travel route for an autonomous vehicle can be received or identified (step 802). Historical accident information for the travel route can be analyzed (step 804) to, for example, determine accident types which occurred over the travel route. The analysis can identify accidents which occurred while driving manually or autonomously (step 806) over the travel route. The analysis can include determining causes and/or probable causes of the accident types which occur over the travel route (step 808). In response to determining accident types and causes/probable causes of the accident types over the travel route, adjustments can be made to the driving actions planned for the autonomous vehicle over the travel route (step 810). The adjustments can be made based on the causes/probable causes of the accident types in order to avoid the accident types during travel over the travel route. For example, when a cause/probable cause of an accident type over a travel route is determined to be excess speed, the adjustment of driving actions planned for the autonomous vehicle can include a reduction of speed of travel of the autonomous vehicle over the travel route. In addition, for example, when a cause/probable cause of an accident type over a travel route is determined to be lack of vehicle traction on the road, the adjustment of driving actions planned for the autonomous vehicle can include engagement of an all-wheel-drive function of the autonomous vehicle over the travel route. In addition, for example, when a cause/probable cause of an accident type over a travel route is determined to be a wildlife crossing, the adjustment of driving actions planned for the autonomous vehicle can include reduction of a speed of travel and preparations for sudden braking and/or evasive maneuvers over the travel route.

Figure 9:
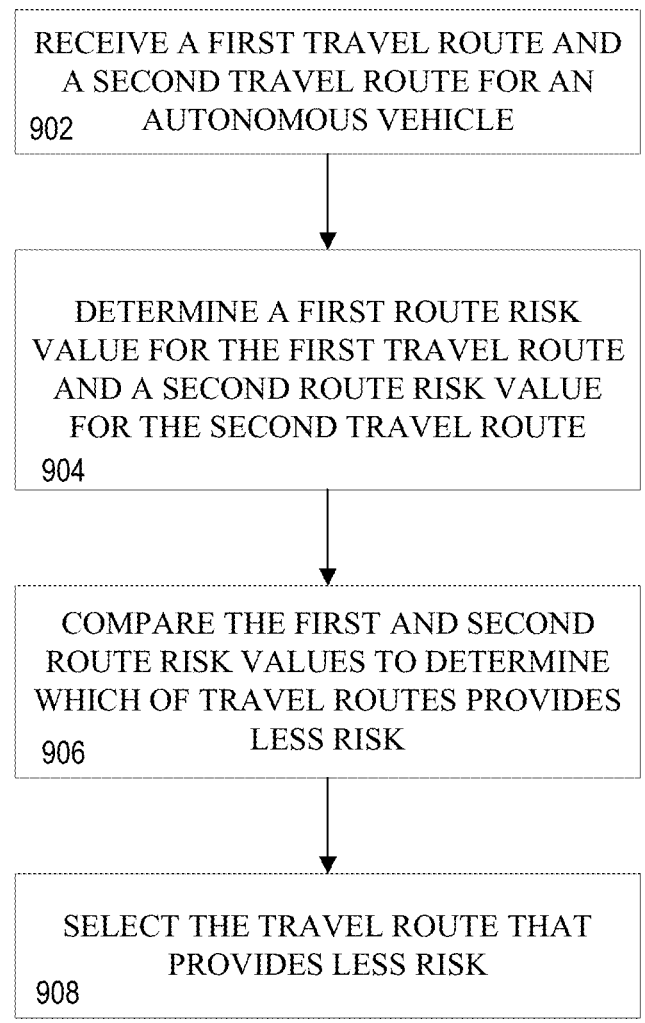
FIG. 9 depicts illustrative steps for analyzing historical accident information to determine risk values for available travel routes and select a travel route which presents less risk of accident than other travel routes.

Referring to FIG. 9, in an embodiment, historical accident information can be used to analyze available travel routes and select a route which presents less risk of accident than others. In an embodiment, at least two travel routes can be received by a risk analysis system (step 902). A route risk value can be determined for each of the travel routes (step 904). The route risk values for each travel route can be compared to determine which route provides less risk of accident over another (step 906). A driver or autonomous driving system can select a travel route on the basis that it provides less risk of accident than another travel route (step 908).

In an aspect of the disclosure, an autonomous or semi-autonomous vehicle may also use its vehicle sensors and information from third parties along with the determined route risk values to determine that it is approaching a road segment where autonomous mode is not advised. In an embodiment, the vehicle may notify the driver in a variety of ways such as through an audio notification in the vehicle, a visual cue or flashing lights inside the vehicle, vehicle horn, an application running on the driver's mobile device and in numerous other ways. For example, a driver may hear a warning message such as "Safe/unsafe autonomous/non-autonomous driving zone starting in one mile ahead and continuing for the next ten miles thereafter, recommend switching control mode." In an embodiment, a driver may take over control of the vehicle and notify the vehicle that they have taken control. A driver notification to the vehicle that the driver has taken control may be through some sort of physical act such as by moving the steering wheel or applying pressure to the gas or brake pedal, activating a button on the dashboard, or through a mobile device application or some other affirmative response.

In an embodiment, safe/unsafe autonomous driving zones may be polygonal, linear, or point based features. For example, a polygonal feature may represent a flood area that contains high water on the roadway, a linear feature may represent a section of road that has high pedestrian activity such as a sporting event that has finished, and a point feature may represent an intersection that has lost power with police directing traffic. In an embodiment, a vehicle may reroute around determined unsafe zones to avoid unsafe road segments. For instance, the vehicle may avoid road segments determined to be experiencing flooding or other hazards conditions. In another embodiment, the vehicle may take action to place itself and its driver into a safe autonomous mode should the driver fail to respond and take over control of the vehicle within a predetermined time frame.

In an aspect of the disclosure, a driver may choose to preset preferences for how the vehicle should respond if the driver fails to respond to the early warning notification. In one example, the vehicle may perform a safe stop ahead of a manual driving area if the driver fails to take control of the vehicle. Other examples of how the vehicle may react if a driver fails to take control of the vehicle include but are not limited to: (1) taking a different route, (2) slowing down but not stopping, (3) taking actions to get the vehicle into a safe autonomous mode, (4) pretension vehicle seat-belts or brakes in case the vehicle needs to stop suddenly, (5) pass control of the vehicle to another driver remotely (e.g. (a) vehicle becomes a drone and follows the vehicle directly in front of it, (b) gives control to another person in the vehicle who gives verbal instructions to the vehicle), (6) engage in additional heighted analysis (use other vehicles) to analyze road segments and environment more closely (the heightened analysis may come from information collected by other vehicles or infrastructure and received by the vehicles onboard computer systems, (7) the vehicle may have preset preferences based on a driver's characteristics or preference to take different actions depending on the circumstances, (8) lock doors in high crime areas, and (8) pull over or slow down for emergency vehicles.

In another embodiment, preset preferences may also be used to determine (a) when to use or not use autonomous mode, (b) how to preset safety features in the vehicle (tension seat belts). In an embodiment, sensor failure or sensor degradation may cause the vehicle to need to be placed into a non-autonomous mode. If a driver ignores or consistently ignores non-autonomous mode early notification signals, insurance rates may change along with policy coverages. In some cases, only a certain percentage of vehicles in a given area need to be non-autonomous (e.g., 80% or more non-autonomous). For cars that remain in autonomous mode, the driver may pay a higher rate.

In an aspect of the disclosure, preset preferences may be used to have a vehicle behave in a certain manner when encountering or approaching certain predefined areas such as school zones, railroad crossing, or in areas with nearby stadiums during scheduled performances. In an embodiment during a driving event, a driver may be notified of the approaching school zones, rail road crossing, or stadium proximities.

In an aspect of the disclosure, a driver may fail to take control of a vehicle when requested for a number of reasons including a medical emergency such as a heart attack or stroke. In an embodiment, a vehicle upon determining the cause for the lack of driver response (via sensors described above) may proceed to stop the vehicle and contact emergency responders.

In another aspect of the disclosure, a vehicle may notify third parties such as other drivers that the vehicle is in autonomous mode when it should be in a non-autonomous mode. In an embodiment, to notify third parties, the vehicle may begin honking its horn and/or flashing its lights, may set off an alarm system, or may take some other action to notify third parties.

In another aspect of the disclosure, a third party may act to protect a vehicle in autonomous mode that should be in non-autonomous mode. In an embodiment, a third party may act as master controller and control the vehicle similar to a user controlling a drone to ensure the vehicle drives safely and does not cause an accident. For instance, the third party may provide information to the droned vehicle so that it may drive safely. The information may come from sensors on the third-party vehicles or infrastructure which may extend the field of view of the vehicle.

Figure 10:
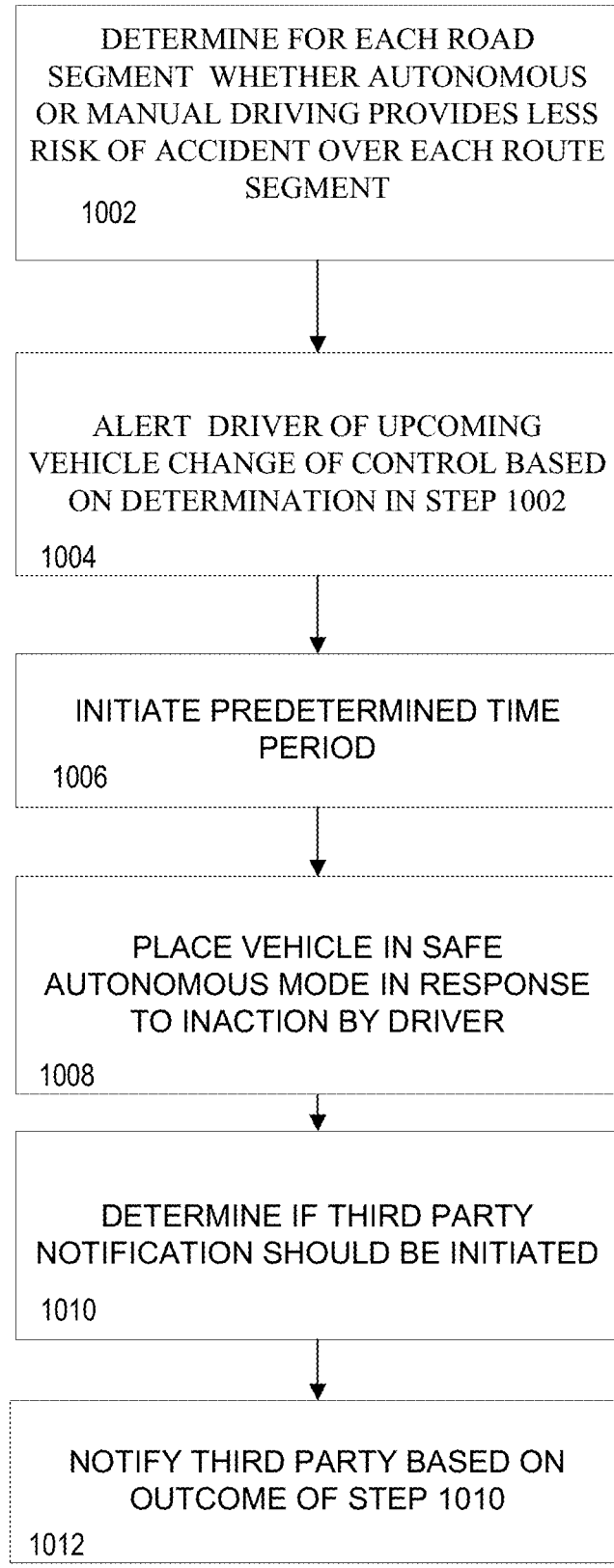
FIG. 10 depicts illustrative steps for alerting a driver to an upcoming vehicle control change in accordance with various aspects of the disclosure.
Figure 11:
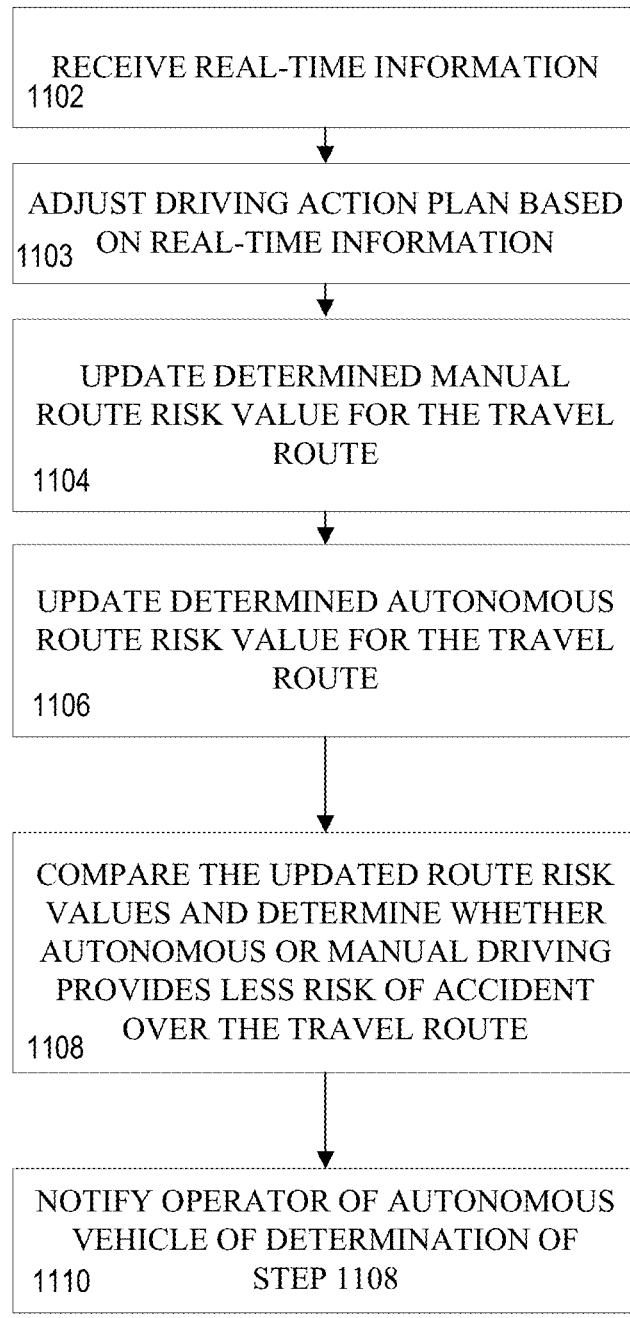
FIG. 11 depicts illustrative steps for analyzing information to determine whether an updated autonomous mode or updated manual mode of driving over a travel route provides less risk of accident.

Referring to FIG. 10, a travel route for an autonomous vehicle is received by the autonomous or semi-autonomous vehicle. The travel route may include a determination for each road segment as to whether an autonomous or manual driving mode provides less risk of an accident over each of the route segments along a travel route (step 1002). The determination of whether autonomous or manual driving provides less risk of an accident over each of the route segments along a travel route may be transmitted to the driver along with the full travel route.

In step 1004, the computing device 102 may alert a driver of an upcoming request for change of vehicle control based on the determination in step 1002. In step 1006, a predetermined period may be initiated to determine if vehicle control has been transferred. If control has not been transferred within the predetermined time period, the vehicle may take action to place itself in a safe autonomous mode (step 1008).

In step 1010, a determination may be made as to whether a third party notification should be initiated. Notification to a third party may be made (step 1012) based on the outcome of step 1010.

In another aspect of the disclosure, a computing device 102 receives real-time information regarding the operation of vehicles on a road or the condition of the road, approaching weather, or other elements related to driving risk. In an embodiment, the real-time information may be provided from other vehicles or from infrastructure. Based on this real-time information, the computing device 102 may provide a notification to the driver that a non-autonomous or autonomous mode should be used.

In addition, an autonomous or semi-autonomous vehicle may use the real-time information to alter the manner in which it operates in autonomous or semi-autonomous mode. For instance, if fog is detected an autonomous or semi-autonomous vehicle may turn on fog lamps, reduce speed, sense vehicle distance ahead, and communicate condition to network and other vehicle. In another example, if black ice is detected by an autonomous or semi-autonomous vehicle, the an autonomous or semi-autonomous vehicle may take action such as activate hazard lights, reduce vehicle speed, change vehicle dynamics profile, communicate conditions, and pre-tension seat belts. Similarly, if rain is detected an autonomous or semi-autonomous vehicle may activate windshield wipers, reduce vehicle speed, change vehicle dynamics, and communicate conditions.

In another aspect of the disclosure, if a deer or other animal is detected an autonomous or semi-autonomous vehicle may automatically slow down significantly if action is not taken by the driver. In an embodiment, spotting an animal (deer, geese, etc.) crossing a road or in close proximity to the road may be communicated to other vehicles within a certain geographic area as more often than not a deer crossing may be followed by a number of additional deer crossings. The communication with other vehicles may be contained to vehicles with a certain distance of the detected animal crossing. In addition, the communication may be through numerous devices such as through smartphones and may include texts to passengers of the vehicles as well as to the driver.

In another example, an autonomous or semi-autonomous vehicle may automatically slow down significantly if the vehicle detects (via sensors, cameras, or other devices) a moving ball type object in anticipation that a child may enter the roadway to retrieve it. In another embodiment, an autonomous or semi-autonomous vehicle may automatically communicate with police or other emergency responders if an instance of road rage or erratic driving is detected. The communication may include the GPS location of the detected incident.

An autonomous or semi-autonomous vehicle may automatically modify vehicle operations based on approaching emergency vehicles by reducing speed, changing lanes, pulling to shoulder, lowering the radio volume, and/or turning on hazards lights. Moreover, the actions taken by the vehicle which are based on real-time information may also be based on information regarding the driver and the driver's personal reactions to situations, insurance information regarding past drivers, accidents and claims, and driver preferences, among other things.

In an embodiment, information sent from one vehicle or infrastructure device may be transmitted only in a particular area. In such a case, a vehicle may retransmit the information backward or forward to additional vehicles. In one example, a vehicle may send a signal to a stationary piece of infrastructure. The stationary infrastructure may then continuously transmit the information within a certain bubble, and as soon as other vehicles enter the bubble, they receive the information. This information sharing may allow other autonomous or semi-autonomous vehicles to more accurately determine when to switch from non-autonomous mode to autonomous mode and vice versa.

In an aspect to the disclosure, vehicle-to-vehicle (V2V) communication or vehicle-to-infrastructure (V2I) communication may be accomplished with a short-range vehicle-based data transmission systems configured to transmit vehicle operational data to other nearby vehicles, and to receive vehicle operational data from other nearby vehicles. In some examples, the communication system may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle to vehicle transmissions between the short-range communication systems may be sent via DSRC, Bluetooth, satellite, GSM infrared, IEEE 802.11, WiMAX, RFID, and/or any suitable wireless communication media, standards, and protocols. In certain systems, short-range communication systems may include specialized hardware installed in vehicles (e.g., transceivers, antennas, etc.), while in other examples the communication systems may be implemented using existing vehicle hardware components (e.g., radio and satellite equipment, navigation computers) or may be implemented by software running on the mobile devices and of drivers and passengers within the vehicles.

The range of V2V communications between vehicles may depend on the wireless communication standards and protocols used, the transmission/reception hardware (e.g., transceivers, power sources, antennas), and other factors. Short-range V2V communications may range from just a few feet to many miles, and different types of driving behaviors may be determined depending on the range of the V2V communications. For example, V2V communications ranging only a few feet may be sufficient for a driving analysis computing device in one vehicle to determine that another vehicle is tailgating or cut-off the vehicle, whereas longer communications may allow the device to determine additional types of driving behaviors (e.g., vehicle spacing, yielding, defensive avoidance, proper response to a safety hazard, etc.) and driving conditions (e.g., congestion).

V2V communications also may include vehicle to infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle to any other vehicle, or other infrastructure device capable of receiving the communication, within the range of the vehicle's transmission capabilities. For example, a vehicle may periodically broadcast (e.g., every 0.1 second, every 0.5 seconds, every second, every 5 seconds, etc.) certain vehicle operation data via its short-range communication system, regardless of whether or not any other vehicles or reception devices are in range. In other examples, a vehicle communication system may first detect nearby vehicles and receiving devices, and may initialize communication with each by performing a handshaking transaction before beginning to transmit its vehicle operation data to the other vehicles and/or devices.

In an aspect of the disclosure, risks noted on one road may be transferred to other roads with similar characteristics, even though the risk has not been specifically noted on the road. In an example, additional vehicles may be used to verify a risk provided by one vehicle or provided by correlation of a road segment to a similar road segment that has been identified with risk. Vehicles may vote on risk and may verify accuracy of the scope of risk.

In an embodiment, infrastructure may take actions based on information from the vehicle. For example, the infrastructure may dispense salt or call a vehicle to come and dispense salt. The infrastructure may also post signs or change signs based on the real-time information. Intelligence on whether to change the sign may rest in the sign itself so that information need not be transmitted to a central hub prior to going to the sign. The information may be transmitted directly from each vehicle to the sign.

In yet another aspect of the disclosure, a vehicle may make operational changes based on characteristics of the driver. For example, if it determined that a driver's eyes are closed or that the driver is impaired in some manner, the vehicle may put itself into fully autonomous mode or take other appropriate actions.

In another aspect of the disclosure, based on the determined route risk values for road segments along a route to be traveled along with real-time information, a determination of non-autonomous driving areas may be generated and displayed to the driver. In an embodiment, a notification may be given to a driver that a non-autonomous area of driving is approaching. An early indication that a recommended switch to a non-autonomous mode of driving is approaching may give the driver sufficient time to react and take over manual control in unsafe zones and vice versa let the vehicle operate in autonomous or semi-autonomous mode in safe zones. For instance, real-time information may locate instances of slippery road surfaces on a roadway and may be used to alert autonomous or semi-autonomous vehicles to initiate slower speeds. Also, real-time information from vehicles may specifically identify exact locations of where black ice may be forming on road surfaces.

In some situations, the car may first give a warning to the manual driver to take action within a certain time and if the driver does not take any action within the specified time the car may take over fully from the individual or take another less risky route. The time given to the driver and the action taken may vary depending on the severity of the situation. In other situations, the car may take over some or no functions. An example of where a warning coupled with action would be beneficial if an anomaly is detected based on the behavior of the driver not consistent with normal/past behavior.

The real-time information provides actionable information by semi-autonomous and autonomous vehicles which may include but is not limited to turning on hazard lights, reducing vehicle speed, pulling over the vehicle on the shoulder and stopping, pre-tightening seat belts, begin applying the brakes based on real-time trip data, moving to rightmost lane, explicitly sending alerts to other vehicles using vehicle to vehicle communications, alerting the passengers in the vehicle, making a 911 call in case of emergency, and other actions to place the vehicle into a safe autonomous zone.

In an aspect of the disclosure, unsafe driving conditions may be determined by real time vehicle to vehicle, vehicle to infrastructure information reporting, and/or historical information. These safety management services may be delivered to each vehicle specifically within the area of operation. This may ensure that each vehicle, enabled with this technology and operating within a designated driver mode required zone, is under control of the driver alerted to the change in driving mode.

In an aspect of the disclosure, a computing device 102 may receive a first travel route for an autonomous or semi-autonomous vehicle. Next, the computing device 102 may determine an autonomous route risk value for a first travel route using historical accident information of vehicles engaged in autonomous driving over the first travel route.

In an embodiment, the computing device 102 may determine a manual route risk value for the first travel route using historical accident information of vehicles engaged in manual driving over the first travel route. The computing device 102 may compare the autonomous route risk value to the manual route risk value and determine which of autonomous driving or manual driving provides a lower risk of accident over the first travel route. The computing device 102 may store the determination that either autonomous driving or manual driving provides the lower risk of accident over the first travel route.

In an embodiment, a driver of an autonomous or semi-autonomous vehicle may be notified of the determination that either autonomous driving or manual driving provides the lower risk of accident over the first travel route. In an embodiment, computing device 102 may receive real-time information (in step 1102) regarding the operation of vehicles on a road or the condition of the road, approaching weather, or other elements related to driving risk. In an embodiment, this real-time information may be provided from other vehicles or from infrastructure. Based on the real-time information, the driving actions planned for the autonomous vehicle over the travel route may be adjusted (in step 1103).

In an embodiment, computing device 102 may update the determined manual route risk value based on the received real-time data (in step 1104). Computing device 102 may also determine an updated autonomous route risk based on the received real-time data (in step 1106).

In an embodiment, computing device 102 may compare the autonomous route risk value to the manual route risk value and determine which of autonomous driving or manual driving provides a lower risk of accident over the first travel route (in step 1108). In an embodiment, a driver of an autonomous or semi-autonomous vehicle may be notified of the determination that either the updated autonomous driving or the updated manual driving provides the lower risk of accident over the first travel route (in step 1110).

In an embodiment, a notification may be given to a driver that a non-autonomous area of driving is approaching. An early indication that a recommended switch to a non-autonomous mode of driving is approaching may give the driver sufficient time to react and take over manual control in unsafe zones and vice versa let the vehicle operate in autonomous or semi-autonomous mode in safe zones.

While the disclosure has been described with respect to specific examples including presently exemplary modes of carrying out the disclosure, those skilled in the art will appreciate that there are numerous variations and permutations of the above-described systems and techniques that fall within the spirit and scope of the disclosure.

What is claimed is:

1. One or more non-transitory computer-readable media storing instructions that, when executed by one or more processors, cause the one or more processors to:
   receive real-time data associated with a vehicle;
   adjust a driving action planned for the vehicle over a travel route based on the real-time data;
   update a manual route risk value based on the real-time data, the manual route risk value associated with the vehicle operating in a manual driving mode;
   update an autonomous route risk value based on the real-time data, the autonomous route risk value associated with the vehicle operating in an autonomous driving mode;
   compare the autonomous route risk value to the manual route risk value to determine whether the autonomous driving mode or the manual driving mode provides a lower risk of accident over the travel route; and
   generate a notification indicating whether the autonomous driving mode or the manual driving mode provides the lower risk of accident over the travel route.

2. The one or more non-transitory computer-readable media of claim 1, wherein the vehicle is an autonomous or semi-autonomous vehicle.

3. The one or more non-transitory computer-readable media of claim 1, wherein the real-time data is associated with one or more of operation of the vehicle, a condition of a road along the travel route, or weather present or approaching the travel route.

4. The one or more non-transitory computer-readable media of claim 1, wherein the real-time data may be provided from the vehicle, other vehicles, or from infrastructure.

5. The one or more non-transitory computer-readable media of claim 1, wherein adjusting of the driving action includes one or more of change in speed of the vehicle, engagement of an all-wheel drive system of the vehicle, preparation for sudden braking, or preparation of evasive maneuvers.

6. The one or more non-transitory computer-readable media of claim 1, wherein the autonomous driving mode includes a semi-autonomous driving mode.

7. The one or more non-transitory computer-readable media of claim 6, wherein the semi-autonomous driving mode includes one or more of an assist mode, a partial automation mode, a conditional automation mode, or a high automation mode.

8. An apparatus, comprising:
   a processor configured to execute computer-executable instructions; and
   a memory storing the computer-executable instructions that, when executed by the processor, cause the apparatus to:
   receive real-time data associated with a vehicle;
   adjust a driving action planned for the vehicle using the real-time data;
   adjust a manual route risk value based on the real-time data, the manual route risk value associated with a manual driving mode of the vehicle;
   adjust an autonomous route risk value based on the real-time data, the autonomous route risk value associated with an autonomous driving mode of the vehicle;
   compare the autonomous route risk value to the manual route risk value to determine whether the autonomous driving mode or the manual driving mode provides a lower risk of accident; and
   generate a notification indicating whether the autonomous driving mode or the manual driving mode provides the lower risk of accident.

9. The apparatus of claim 8, wherein the vehicle is an autonomous or semi-autonomous vehicle.

10. The apparatus of claim 8, wherein the real-time data is associated with one or more of operation of the vehicle, a condition of a road along a travel route, or weather present or approaching the travel route.

11. The apparatus of claim 8, wherein the real-time data may be provided from the vehicle, other vehicles, or from infrastructure.

12. The apparatus of claim 8, wherein adjusting of the driving action includes one or more of change in speed of the vehicle, engagement of an all-wheel drive system of the vehicle, preparation for sudden braking, or preparation of evasive maneuvers.

13. The apparatus of claim 8, wherein the autonomous driving mode includes a semi-autonomous driving mode.

14. The apparatus of claim 13, wherein the semi-autonomous driving mode includes one or more of an assist mode, a partial automation mode, a conditional automation mode, or a high automation mode.

15. The apparatus of claim 8, wherein the notification includes one or more of an audio notification or a visual cue.

16. A method comprising:
updating a driving action planned for a vehicle based on received real-time data;
updating a manual route risk value based on the received real-time data, the manual route risk value associated with a manual driving mode of the vehicle;
adjusting an autonomous route risk value based on the received real-time data, the autonomous route risk value associated with an autonomous driving mode of the vehicle;
comparing the autonomous route risk value to the manual route risk value to determine whether the autonomous driving mode or the manual driving mode is safer; and
generating a notification indicating whether the autonomous driving mode or the manual driving mode is safer.

17. The method of claim 16, wherein the received real-time data is associated with one or more of operation of the vehicle, a condition of a road along a travel route, or weather present or approaching the travel route.

18. The method of claim 16, wherein the received real-time data may be provided from the vehicle, other vehicles, or from infrastructure.

19. The method of claim 16, wherein adjusting of the driving action includes one or more of change in speed of the vehicle, engagement of an all-wheel drive system of the vehicle, preparation for sudden braking, or preparation of evasive maneuvers.

20. The method of claim 16, wherein the autonomous driving mode includes a semi-autonomous driving mode, and
wherein the semi-autonomous driving mode includes one or more of an assist mode, a partial automation mode, a conditional automation mode, or a high automation mode.

* * * * *